(12) United States Patent
Chiao et al.

(10) Patent No.: US 7,283,316 B2
(45) Date of Patent: Oct. 16, 2007

(54) VERTICAL TRACK ZONING FOR DISK DRIVES

(75) Inventors: Jim Chiao, Saratoga, CA (US); Teddy Hadiono, San Jose, CO (US); Allen Cheng-wu Hu, Fremont, CA (US); Annie Mylang Le, San Jose, CA (US); Perry Neos, Milpitas, CA (US); Chad Schroter, Los Gatos, CA (US); Eric Wong, Fremont, CA (US); Yan Zang, San Jose, CA (US); Charles W. Miller, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 313 days.

(21) Appl. No.: 10/340,855

(22) Filed: Jan. 10, 2003

(65) Prior Publication Data

US 2004/0136104 A1 Jul. 15, 2004
US 2006/0018051 A9 Jan. 26, 2006

Related U.S. Application Data

(63) Continuation of application No. 10/053,220, filed on Jan. 17, 2002, now abandoned.

(51) Int. Cl.
*G11B 5/09* (2006.01)
(52) U.S. Cl. ............... 360/48; 360/31; 360/75
(58) Field of Classification Search ............... 360/48, 360/31, 61, 77.08, 65, 53, 75, 64, 360
See application file for complete search history.

(56) References Cited

U.S. PATENT DOCUMENTS

| | | | | |
|---|---|---|---|---|
| 4,945,427 A | * | 7/1990 | Cunningham | 360/75 |
| 5,521,945 A | | 5/1996 | Knudson | 375/341 |
| 5,537,264 A | * | 7/1996 | Pinteric | 360/31 |
| 5,587,850 A | | 12/1996 | Ton-that | 360/77.08 |
| 5,870,237 A | * | 2/1999 | Emo et al. | 360/48 |
| 5,999,352 A | * | 12/1999 | Teck et al. | 360/48 |
| 6,052,250 A | * | 4/2000 | Golowka et al. | 360/77.08 |
| 6,061,195 A | * | 5/2000 | Wilson et al. | 360/48 |
| 6,091,559 A | * | 7/2000 | Emo et al. | 360/48 |
| 6,182,250 B1 | * | 1/2001 | Ng et al. | 714/704 |
| 6,393,511 B1 | * | 5/2002 | Albrecht et al. | 711/4 |

(Continued)

OTHER PUBLICATIONS

"Measure a Disk-Drive's Read Channel Signals", Aug. 1999, Test & Measurement World, Published by Cahners Business Information, Newton, MA.

*Primary Examiner*—Tan Dinh
*Assistant Examiner*—Dismery Mercedes
(74) *Attorney, Agent, or Firm*—Myers Bigel Sibley & Sajovec, PA

(57) ABSTRACT

A data storage device has multiple storage media surfaces and corresponding heads, each storage media surface includes multiple regions, and each head is for recording on and playback of information from a corresponding storage media surface. A method of defining a storage format for the storage media surfaces includes reading data from each region on each storage media surface with the corresponding head, measuring a record/playback performance of each head for each region on each corresponding storage media surface based on the data read from the regions, and selecting a track density for each region on each storage media surface based on the measured record/playback performance of the corresponding head for the region.

85 Claims, 13 Drawing Sheets

U.S. PATENT DOCUMENTS

| | | | |
|---|---|---|---|
| 6,437,947 B1 * | 8/2002 | Uno | 360/78.04 |
| 6,751,036 B2 * | 6/2004 | Quak et al. | 360/48 |
| 6,778,343 B2 * | 8/2004 | Nunnelley | 360/31 |
| 6,957,379 B1 * | 10/2005 | Patapoutian et al. | 714/774 |
| 6,975,468 B1 * | 12/2005 | Melrose et al. | 360/31 |
| 7,012,771 B1 * | 3/2006 | Asgari et al. | 360/31 |

* cited by examiner

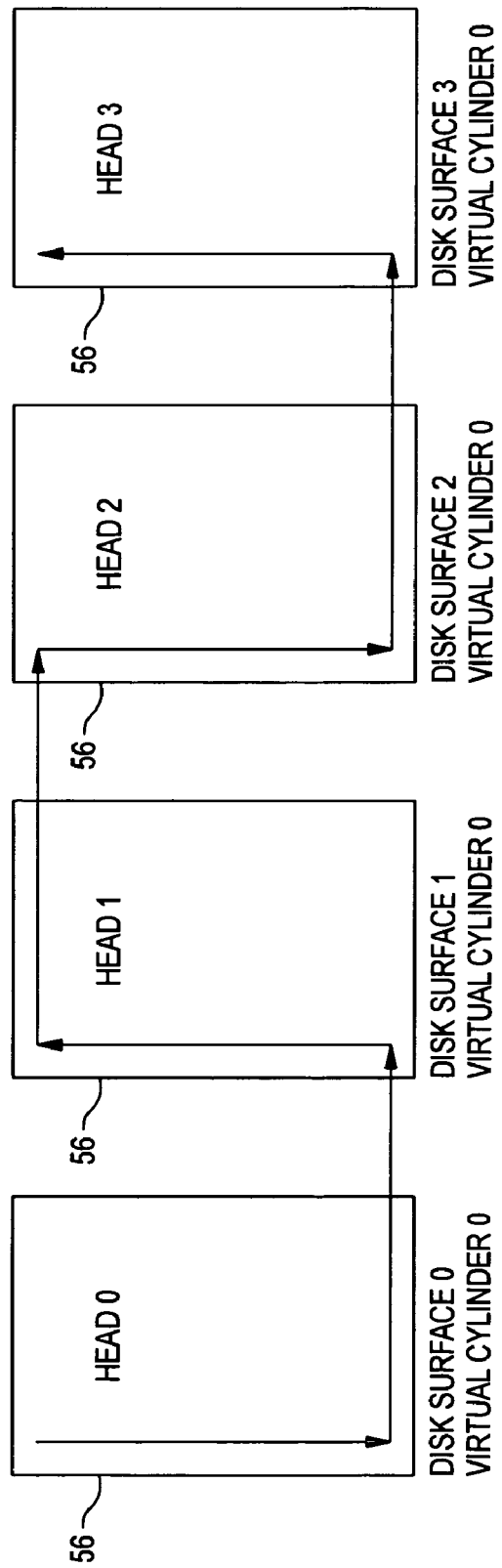

VERTICAL TRACK ZONING FOR DISK DRIVES

CROSS-REFERENCE TO RELATED APPLICATIONS

This application is a continuation of U.S. application Ser. No. 10/053,220 filed Jan. 17, 2002 now abandoned, which is incorporated by reference herein in its entirety.

FIELD OF THE INVENTION

The present invention relates to information storage on a storage media such as a disk in a disk drive.

BACKGROUND OF THE INVENTION

Data storage devices such as disk drives are used in many data processing systems. Typically a disk drive includes a magnetic data disk having disk surfaces with concentric data tracks, and a transducer head paired with each disk surface for reading data from and writing data to the data tracks.

Disk drive storage capacity increases by increasing the data density (or areal density) of the data stored on the disk surfaces. Data density is the linear bit density on the tracks multiplied by the track density across the disk surface. Data density is measured in bits per square inch (BPSI), linear bit density is measured in bits per inch (BPI) and track density is measured in tracks per inch (TPI). As data density increases, the head performance distribution also increases which diminishes disk drive storage capacity and yield.

Conventional disk drives fail to account for the different capabilities of the head and disk surface pairs. Conventionally, each disk surface is formatted to store the same amount of data as every other disk surface. However, each head and disk surface pair has unique data recording capability, such as sensitivity and accuracy, which depends on the fly height of the head over the disk surface, the magnetic properties of the head and the quality/distribution of the magnetic media for the disk surface. Thus, in conventional disk drives a head and disk surface pair that has a low error rate is formatted to the same BPI and TPI as a head and disk surface pair that has a high error rate.

Conventional disk drive manufacturing applies a single error rate and a single storage capacity for the head and disk surface pairs, and scraps disk drives that include a low performing head and disk surface pair that fails to meet the qualifying requirements. This lowers storage capacity due to inefficient use of high performing head and disk surface pairs that can store more data, and lowers yield due to disk drives being scrapped if they include a low performing head and disk surface pair even if they also include a high performing head and disk surface pair.

Conventional disk drives vary BPI to optimize the linear bit density capabilities of the heads. However, with increasing TPI it is difficult to control the head width relative to the shrinking track pitch. As a result, head yield and disk drive yield suffer.

There is, therefore, a need for storing data in a disk drive which improves storage capacity and yield and accounts for head performance variation.

SUMMARY OF THE INVENTION

The present invention uses vertical zoning to improve the performance, storage capacity and yield of data storage devices such as disk drives by optimizing the TPI and optionally BPI across multiple regions for each head/media pair.

In an embodiment, a data storage device has multiple storage media surfaces and corresponding heads, each storage media surface includes multiple regions, and each head is for recording on and playback of information from a corresponding storage media surface. A method of defining a storage format for the storage media surfaces includes reading data from each region on each storage media surface with the corresponding head, measuring a record/playback performance of each head for each region on each corresponding storage media surface based on the data read from the regions, and selecting a track density for each region on each storage media surface based on the measured record/playback performance of the corresponding head for the region.

In another embodiment, the regions on each storage media surface are concentric regions having an inner and an outer boundary at different radial locations on the storage media surface, each storage media surface includes the same number of regions and the boundaries of radially similarly situated regions on different storage media surfaces are at essentially the same radial locations.

In another embodiment, the record/playback performance of each head for each region is measured at multiple locations, at multiple read/write frequencies and/or at multiple track densities. For instance, the data is recorded in the region at a track density, the recorded data is read from the region, the measured error rate of the recorded data read from the region is compared to an acceptable error rate, and if the measured error rate is greater than the acceptable error rate then the previous steps are repeated for a decremented track density until the measured error rate is less than or equal to the acceptable error rate to provide a maximum recordable track density for the region.

In another embodiment, the record/playback performance of each head is a squeezed and unsqueezed off-track capability of the head.

In another embodiment, the track density is selected from a set of predetermined track densities or derived from an algorithm based on the location of the region on the storage media surface.

In another embodiment, servo tracks are written to each region and then the track density is selected for data tracks in each region.

In another embodiment, the data track density in a first region on a first storage media surface is greater than the data track density in a first region on a second storage media surface, the data track density in a second region on the first storage media surface is less than the data track density in a second region on the second storage media surface, the first regions are radially similarly situated regions and the second regions are radially similarly situated regions.

In another embodiment, the data tracks in a set of radially similarly situated regions are accessed by, for each of the regions, sequentially accessing each data track in the region before accessing data tracks in a subsequent region.

In another embodiment, the data storage device is a disk drive and each storage media surface is a disk surface.

Advantageously, the present invention increases the performance, storage capacity and yield of data storage devices such as disk drives having storage media surfaces such as disk surfaces.

BRIEF DESCRIPTION OF THE DRAWINGS

These and other features, aspects and advantages of the present invention will be better understood with reference to the following description, appended claims and accompanying figures where:

FIG. 15 shows access of data tracks on different disk surfaces in a virtual cylinder.

DETAILED DESCRIPTION OF THE INVENTION

Data storage devices used to store data for computer systems include, for example, disk drives, floppy drives, tape drives, optical and magneto-optical drives and compact drives. Although the present invention is illustrated by way of a disk drive, the present invention can be used in other data storage devices and other storage media, including non-magnetic storage media, as is apparent to those of ordinary skill in the art and without deviating from the scope of the present invention.

Figure 1:
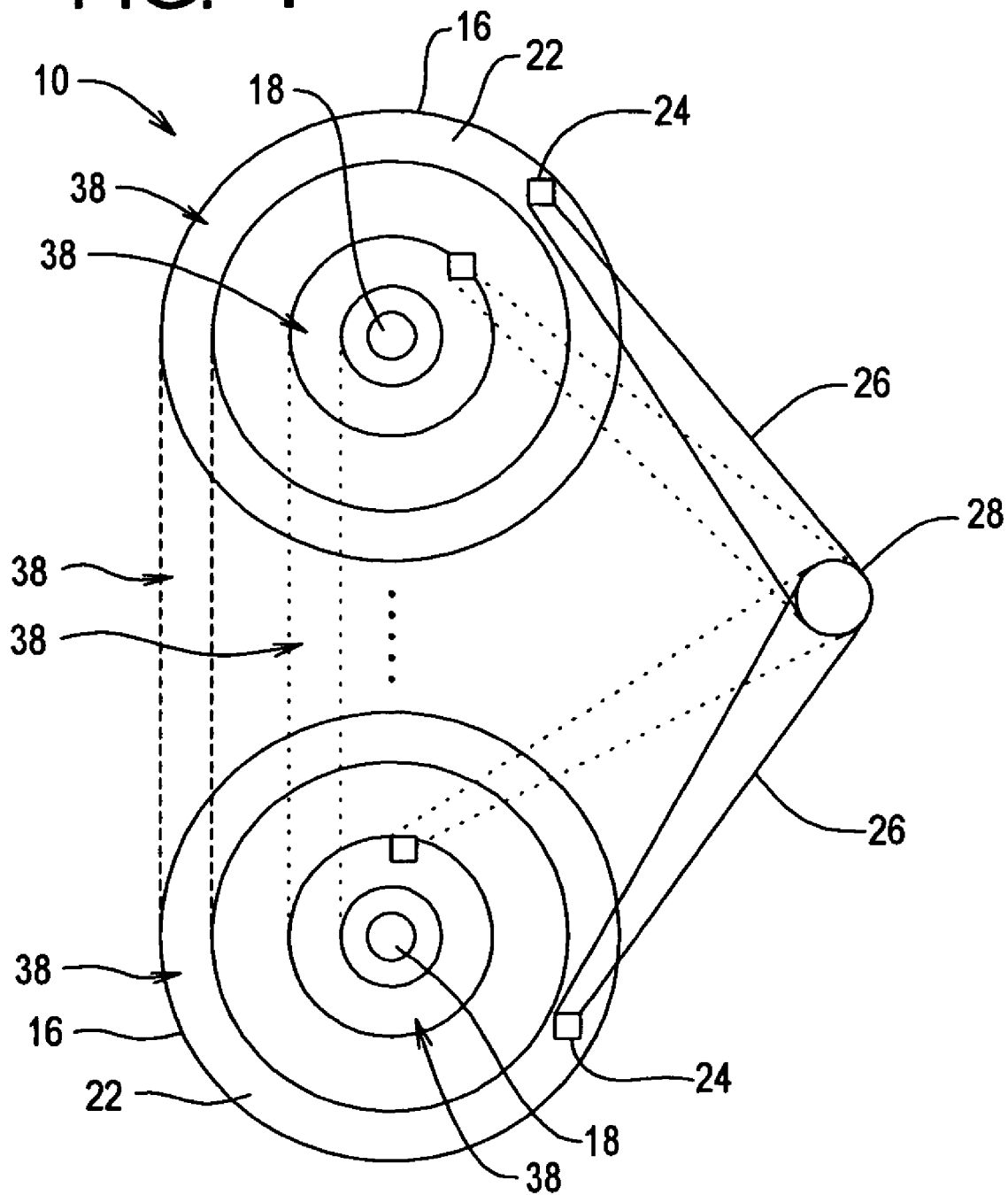
FIG. 1 shows a disk drive which includes multiple heads and disk surfaces.
Figure 2:
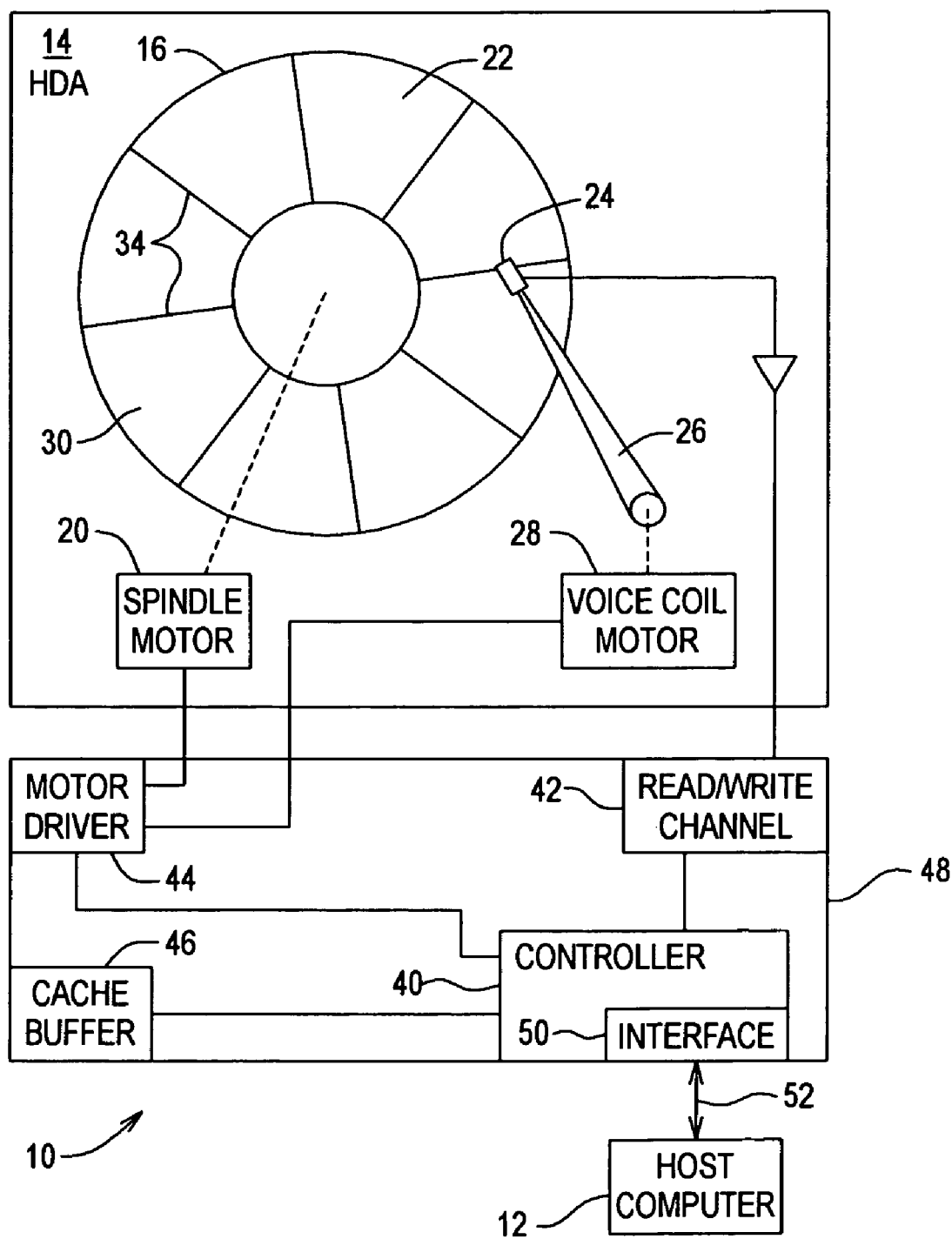
FIG. 2 shows drive electronics in the disk drive.
Figure 3:
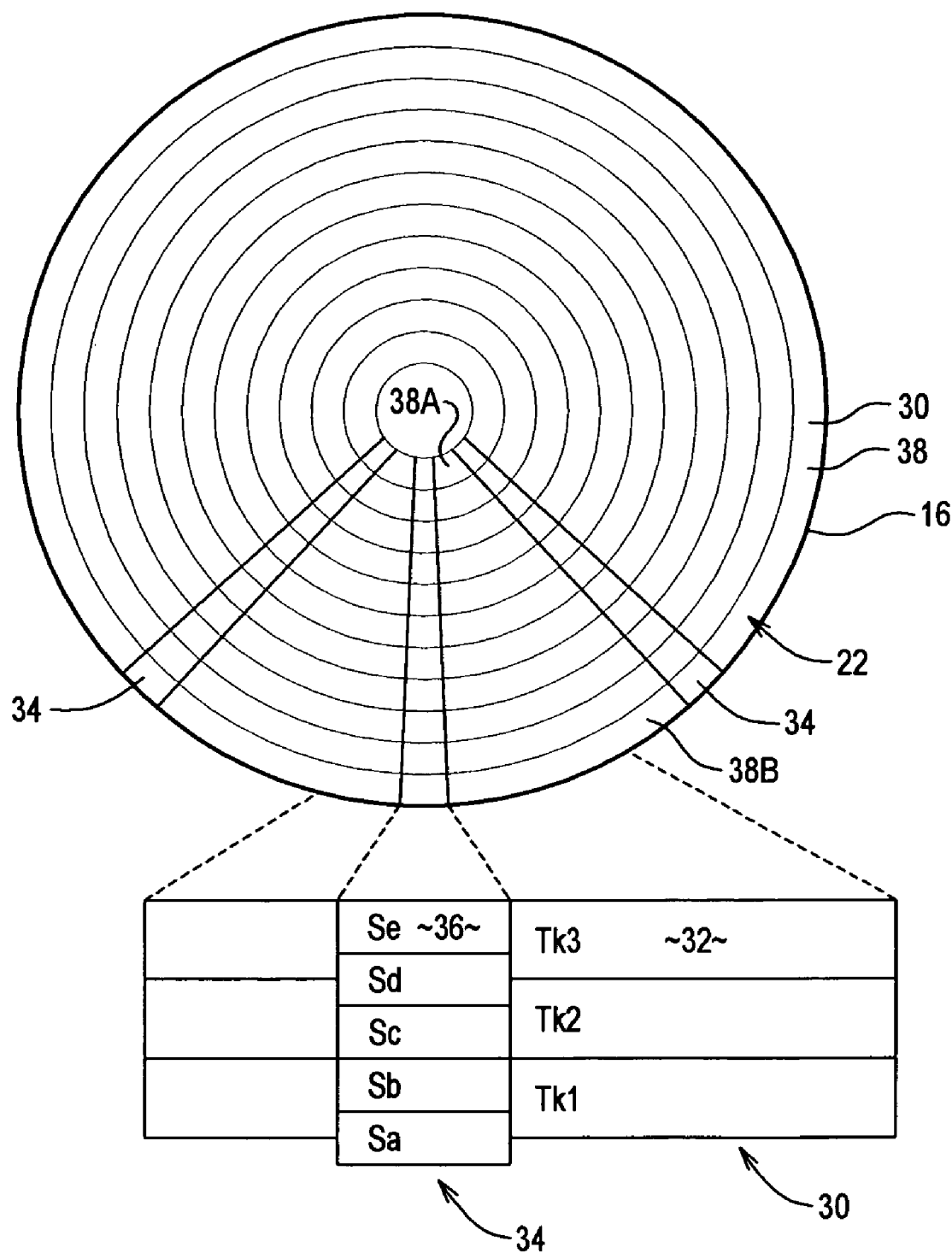
FIG. 3 shows data tracks and servo tracks on a disk surface.

FIGS. 1–3 show a hard disk drive 10 diagrammatically depicted for storing user data and/or operating instructions for a host computer 12. The disk drive 10 includes an electromechanical head-disk assembly (HDA) 14 that includes one or more rotating data storage disks 16 mounted in a stacked, spaced-apart relationship upon a spindle 18 rotated by a spindle motor 20 at a predetermined angular velocity.

Each disk 16 includes a disk surface 22, and usually two disk surfaces 22 on opposing sides. Each disk surface 22 has associated magnetic media for recording data. The spindle motor 20 rotates the spindle 18 to move the disks 16 past the magnetic transducer heads 24 suspended by the suspension arms 26 over each disk surface 22. Generally, each head 24 is attached to a suspension arm 26 by a head gimbal assembly (not shown) that enables the head 24 to swivel to conform to a disk surface 22. The suspension arms 26 extend radially from a rotary voice coil motor 28. The voice coil motor 28 rotates the suspension arms 26 and thereby positions the heads 24 over the appropriate areas of the disk surfaces 22 in order to read from or write to the disk surfaces 22. Because the disks 16 rotate at relatively high speed, the heads 24 ride over the disk surfaces 22 on a cushion of air (air bearing).

Each head 24 includes a read element (not shown) for reading data from a disk surface 22 and a write element (not shown) for writing data to a disk surface 22. Most preferably, the read element is a magneto-resistive or giant magneto-resistive sensor and the write element is inductive and has a write width which is wider than a read width of the read element.

Each disk surface 22 is divided into concentric circular data tracks 30 that each have individually addressable data sectors 32 in which user data is stored in the form of magnetic bits. The data sectors 32 are separated by servo tracks 34 that include narrow embedded servo sectors 36 arranged in radially extending servo spokes. The servo sectors 36 include a series of phase-coherent digital fields followed by a series of constant frequency servo bursts. The servo bursts are radially offset and circumferentially sequential, and are provided in sufficient numbers that fractional amplitude read signals generated by the head 24 from at least two servo bursts passing under the head 24 enable the controller 40 to determine and maintain proper position of the head 24 relative to a data track 30. A servo burst pattern for use with a head that includes a magneto-resistive read element and an inductive write element is described by commonly assigned U.S. Pat. No. 5,587,850 entitled "Data Track Pattern Including Embedded Servo Sectors for Magneto-Resistive Read/inductive Write Head Structure for a Disk Drive" which is incorporated herein by reference.

Each disk surface 22 is also divided into concentric circular regions 38 that each include multiple data tracks 30 and multiple servo tracks 34. The regions 38 each have an inner and an outer boundary at different locations on the disk surface 22, and thus are radially offset from one another. For instance, the inner region 38A includes the innermost data tracks 30 on the disk surface 22, and the outer region 38B includes the outermost data tracks 30 on the disk surface 22. Furthermore, the disk surfaces 22 each contain the same number of the regions 38, and radially similarly situated regions 38 on different disk surfaces 22 have boundaries at essentially the same radial locations and form virtual cylinders. Thus, the virtual cylinders each consist of radially similarly situated regions 38 on different disk surfaces 22.

FIG. 3 shows five servo tracks 34 depicted as servo tracks Sa, Sb, Sc, Sd and Se in relation to three data tracks 30 depicted as data tracks Tk1, Tk2 and Tk3. The servo track density is about 150% of the maximum data track density. The servo track density is determined by the minimum read width of a population of heads 24. After writing the servo tracks 34 at the servo track pitch on the disk surfaces 22, the data tracks 30 can be written at any radial position between the servo tracks 34, as opposed to just the null position where read signals from two servo bursts have equal amplitudes.

The controller 40 controls the heads 24 to read from and write to the disk surfaces 22. The controller 40 preferably is an application specific integrated circuit chip (ASIC) which is connected to other ASICs such as a read/write channel 42, a motor driver 44 and a cache buffer 46 by a printed circuit board 48. The controller 40 includes an interface 50 which is connected to the host computer 12 via a known bus 52 such as an ATA or SCSI bus.

The controller 40 executes embedded or system software including programming code that monitors and operates the disk drive 10. During a read or write operation, the host computer 12 determines the address where the data is located in the disk drive 10. The address specifies the head 24, the data track 30 and the data sector 32. The data is transferred to the controller 40 which maps the address to the physical location in the disk drive 10, and in response to reading the servo information in the servo sectors 36, operates the voice coil motor 28 to position the head 24 over the corresponding data track 30. As the disk surface 22 rotates, the head 24 reads the servo information embedded in each servo sector 36 and also reads an address of each data sector 32 in the data track 30.

During a read operation, when the identified data sector 32 appears under the head 24, the data sector 32 containing the desired data is read. In reading data from the disk surface 22, the head 24 senses a variation in electrical current flowing through the read element when it passes over an area of flux reversals on the disk surface 22. The flux reversals are transformed into recovered data by the read/write channel 42 in accordance with a channel algorithm such as partial response, maximum likelihood (PRML). The recovered data is then read into the cache buffer 46 where it is transferred to the host computer 12. The read/write channel 42 most preferably includes a quality monitor which measures the quality of recovered data and provides an indication of the data error rate. One channel implementation which employs channel error metrics is described in commonly assigned U.S. Pat. No. 5,521,945 entitled "Reduced Complexity EPR4 Post-Processor for Sampled Data Detection" which is incorporated herein by reference. The present invention uses the data error rate to select track density as well as linear bit density and/or error correction codes.

During a write operation, the host computer 12 remembers the address for each file on the disk surface 22 and which data sectors 32 are available for new data. The controller 40 operates the voice coil motor 28 in response to the servo information read from the servo sectors 36 to position the head 24, settles the head 24 into a writing position, and waits for the appropriate data sector 32 to rotate under the head 24 to write the data. To write data on the disk surface 22, an electrical current is passed through a write coil in the write element of the head 24 to create a magnetic field across a magnetic gap in a pair of write poles that magnetizes the disk surface 22 under the head 24. When the data track 30 is full, the controller 40 moves the head 24 to the next available data track 30 with sufficient contiguous space for writing data. If still more track capacity is required, another head 24 writes data to a data sector 32 of another data track 30 on another disk surface 22.

In every disk drive, there is a distribution associated with the performance of the heads and corresponding disk surfaces. The present invention takes advantage of this distribution to determine track density assignments.

Figure 4:
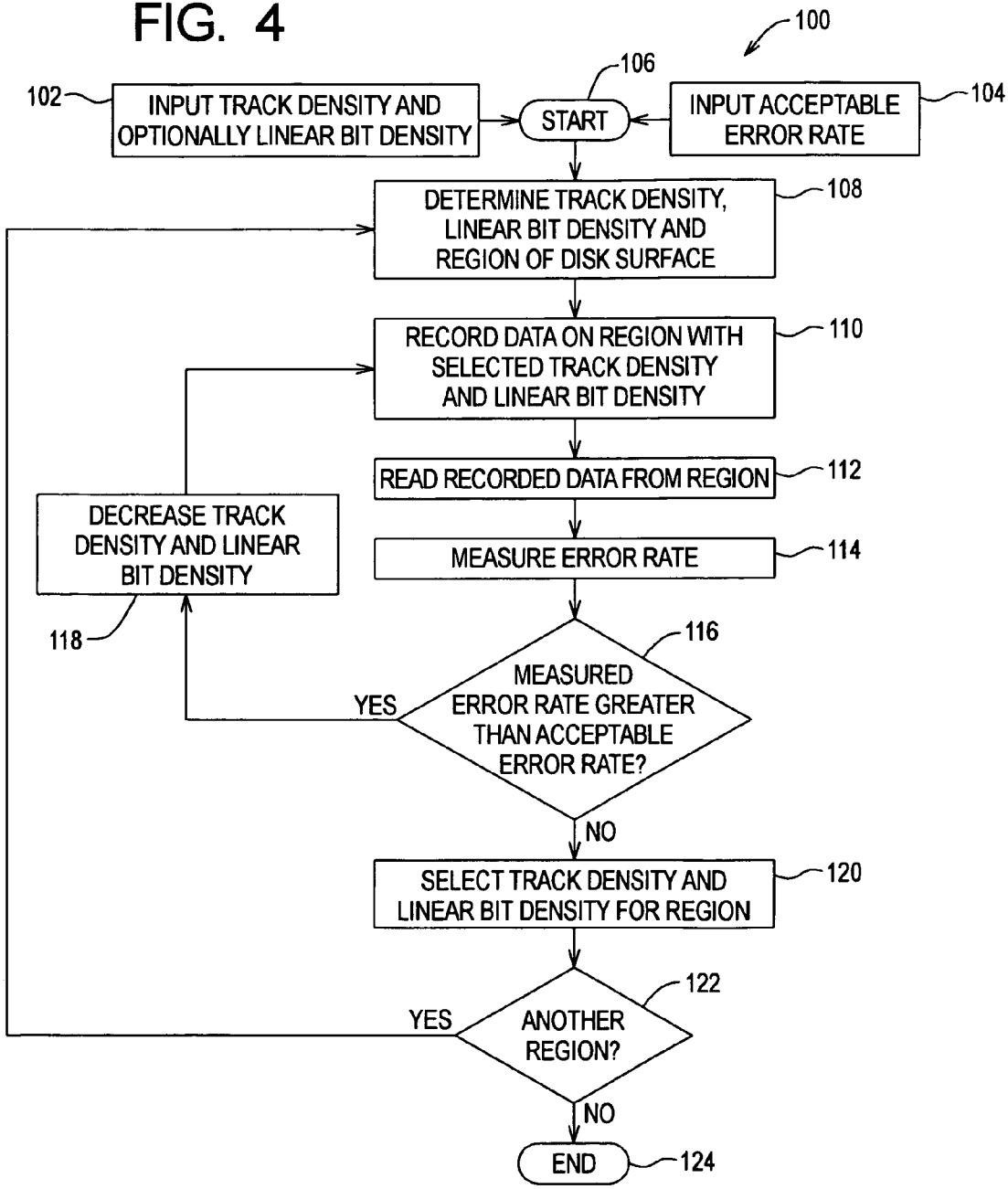
FIG. 4 shows a flow chart for defining a storage format for the disk surfaces.

FIG. 4 shows a flow chart 100 for defining a storage format for the disk surfaces 22. Preferably, the servo tracks 34 are written to the disk surfaces 22, and then the track density is selected for the data tracks 30. The servo track density is greater than the maximum data track density to assure accurate positioning of the heads 24 regardless of the selected data track density. In addition, the track density for the data tracks 30 is individually selected for each region 38 on each disk surface 22 by measurement of recorded data in each region 38 on each disk surface 22 to optimize the storage capacity of each region 38 on each disk surface 22.

Initially, predetermined track densities (TPI) are stored in a table (step 102). Generally, these track densities are incremental or decremental values of one another, for example, a maximum track density can be the highest value in a series of five track densities. Alternatively, the track densities can be derived from an algorithm based on the location of the region 38 on the disk surface 22. The track densities can vary by changing the track width of the data tracks 30 or the space between adjacent data tracks 30. Preferably, the track densities vary by changing the space between adjacent data tracks 30 because the track width of the data tracks 30 is determined by the write width of the write element of the head 24. Optionally, predetermined linear bit densities (BPI) are also stored in the table. In addition, an acceptable error rate, which represents the greatest error rate than can be tolerated, is established (step 104).

The predetermined track densities and linear bit densities and the acceptable error rate are provided to a testing and formatting program during a self-scan operation during manufacturing, and the process starts (step 106). An initial track density, linear bit density and region 38 are determined (step 108). Preferably, the initial track density is the maximum value for the head 24 and the region 38 so that track density for the region 38 can be selected rapidly with few iterations, assuming the region 38 has a track density that is closer to the maximum value than the minimum value. The maximum track density can be calculated or estimated from statistically compiled measured track densities for a population of pairs of heads 24 and disk surfaces 22. The maximum track density can also be based on the location of the region 38 on the disk surface 22. For example, the maximum track density can increase from the inner region 38A to the outer region 38B due to the skew angle of the head 24 relative to the data tracks 30.

The head 24 writes data to the region 38 at the track density and linear bit density (step 110), and then the head 24 reads the recorded data from the region 38 (step 112) and an error rate of the recorded data is measured (step 114). The measured error rate is compared to the acceptable error rate (step 116), and if the measured error rate is greater than the acceptable error rate then the track density and/or the linear bit density is decreased (step 118) and steps 110 to 116 are repeated for the region 38. Steps 110 to 118 repeat as continued iterations until the measured error rate is less than or equal to the acceptable error rate (step 116), at which time the current track density and linear bit density are selected as the maximum recordable track density and linear bit density for the region 38. If another region 38 remains to be tested (step 122) then the process returns to step 108, otherwise the process ends (step 124).

In this manner, the track density for each region 38 is selected based on the performance of the corresponding head 24. For example, if the head 24 has strong measured performance for the region 38 then a high track density (narrow track pitch) is selected for the region 38, whereas if the head 24 has weak measured performance for the region 38 then a low track density (wide track pitch) is selected for the region 38. As a result, variable TPI is provided on a region-by-region basis for each disk surface 22 based on the measured performance of the heads 24. Likewise, variable BPI can be provided on a region-by-region basis. Advantageously, the variable TPI (and optional variable BPI) optimize the storage format of the disk drive 10, thereby increasing the performance, storage capacity and yield of the disk drive 10 over conventional disk drives.

Figures 5, 6:
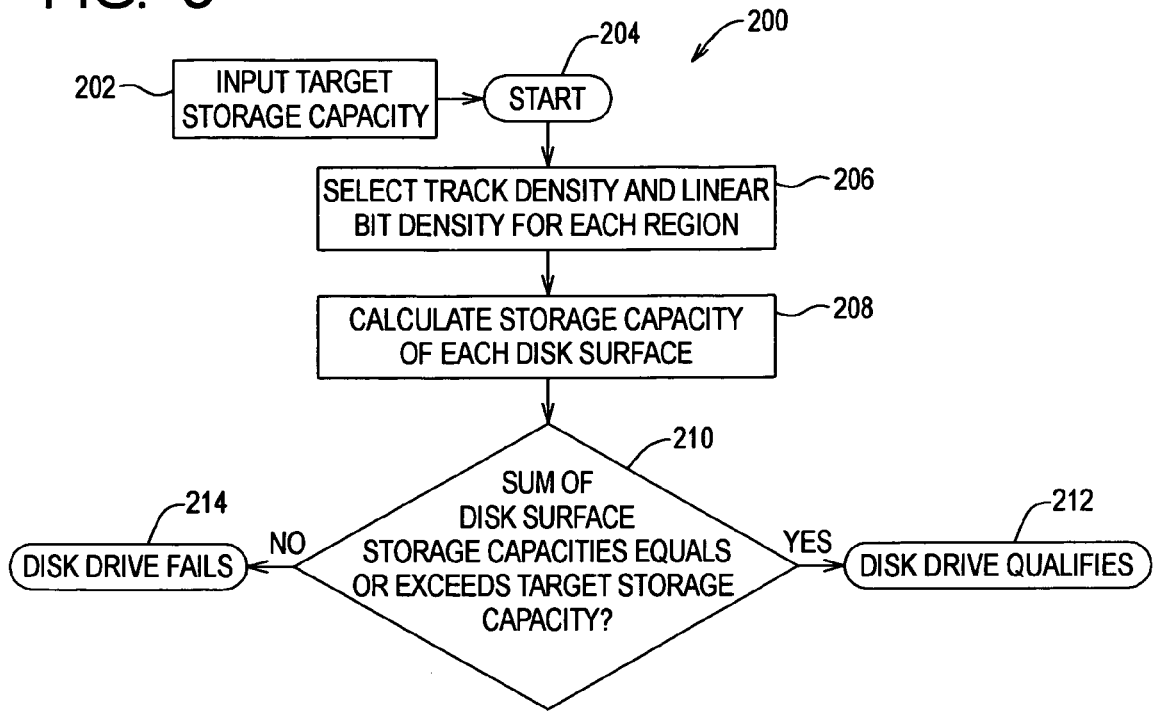
FIG. 5 shows a flow chart for determining the storage capacity of the disk drive.
FIG. 6 shows a conventional storage format with fixed data track density and fixed servo track density in a zone on different disk surfaces and the corresponding heads.

FIG. 5 shows a flow chart 200 for determining the storage capacity of the disk drive 10. Initially, a target storage capacity for the disk drive 10 is established (step 202) and the process starts (step 204). The track density and optionally the linear bit density are selected for each region 38 as in the flow chart 100 (step 206). Thereafter, the storage capacity of each disk surface 22 is calculated as TPI×BPI× (1+ECC)/FE, where TPI is the track density, BPI is the linear bit density, ECC is the fractional level of error correction code which is typically about 0.1, and FE is the format efficiency which is typically about 0.57 (step 208). The storage capacities of the disk surfaces 22 are summed to provide the storage capacity of the disk drive 10, and the storage capacity of the disk drive 10 is compared with the target storage capacity (step 210). If the storage capacity of the disk drive 10 equals or exceeds the target storage capacity then the disk drive 10 qualifies (step 212), otherwise the disk drive 10 fails (step 214).

The flow chart 200 can be modified to perform steps 206, 208 and 210 for a single disk surface 22 and repeat steps 206, 208 and 210 until the disk drive 10 qualifies. That is, if the storage capacity of the disk drive 10 equals or exceeds the target storage capacity based on less than all the disk surfaces 22 then it is not necessary to calculate the storage capacity of the remaining disk surfaces 22 since the disk drive 10 qualifies. However, if the storage capacity of the disk drive 10 is less than the target storage capacity based on less than all the disk surfaces 22 then it is necessary to calculate the storage capacity of the next disk surface 22 until the disk drive 10 qualifies or all the disk surfaces 22 have been evaluated.

After the disk drive 10 is qualified, the controller 40 is programmed to provide the selected track density and linear bit density for formatting the data tracks 30 in each region 38.

FIG. 6 shows a conventional storage format with fixed data track density and fixed servo track density in a zone on different disk surfaces and the corresponding heads. The data track density and the servo track density are the same for each disk surface and each head, regardless of the capabilities of the heads. In this example, the disk drive includes N heads depicted as heads 0, 1 . . . N−1, and the data tracks and servo tracks are formatted in zone 0 as follows:

| | | |
|---|---|---|
| Head 0: | 15 Data Tracks | 15 Data Tracks per 45 Servo Tracks |
| Head 1: | 15 Data Tracks | 15 Data Tracks per 45 Servo Tracks |
| . . . | | . . . |
| Head N−1: | 15 Data Tracks | 15 Data Tracks per 45 Servo Tracks |

Figure 7:
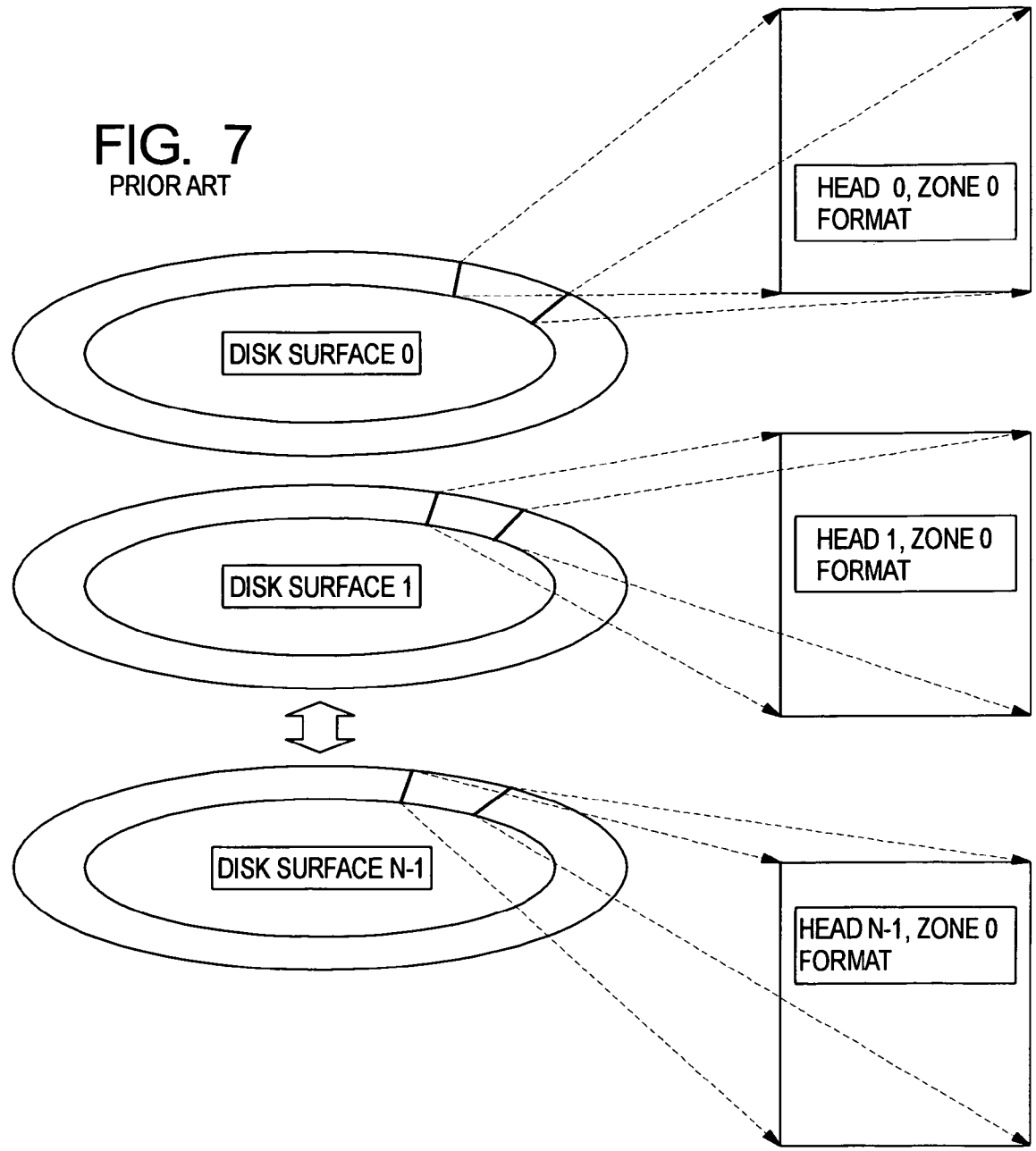
FIG. 7 shows a conventional zone format on different disk surfaces and the corresponding heads.

FIG. 7 shows a conventional zone format on different disk surfaces and the corresponding heads. Each disk surface is divided into several concentric zones, and each zone includes multiple data tracks and multiple servo tracks. In this example, the disk drive includes N disk surfaces depicted as disk surfaces 0, 1 . . . N−1, N heads depicted as heads 0, 1 . . . N−1 and zone 0.

Figure 8:
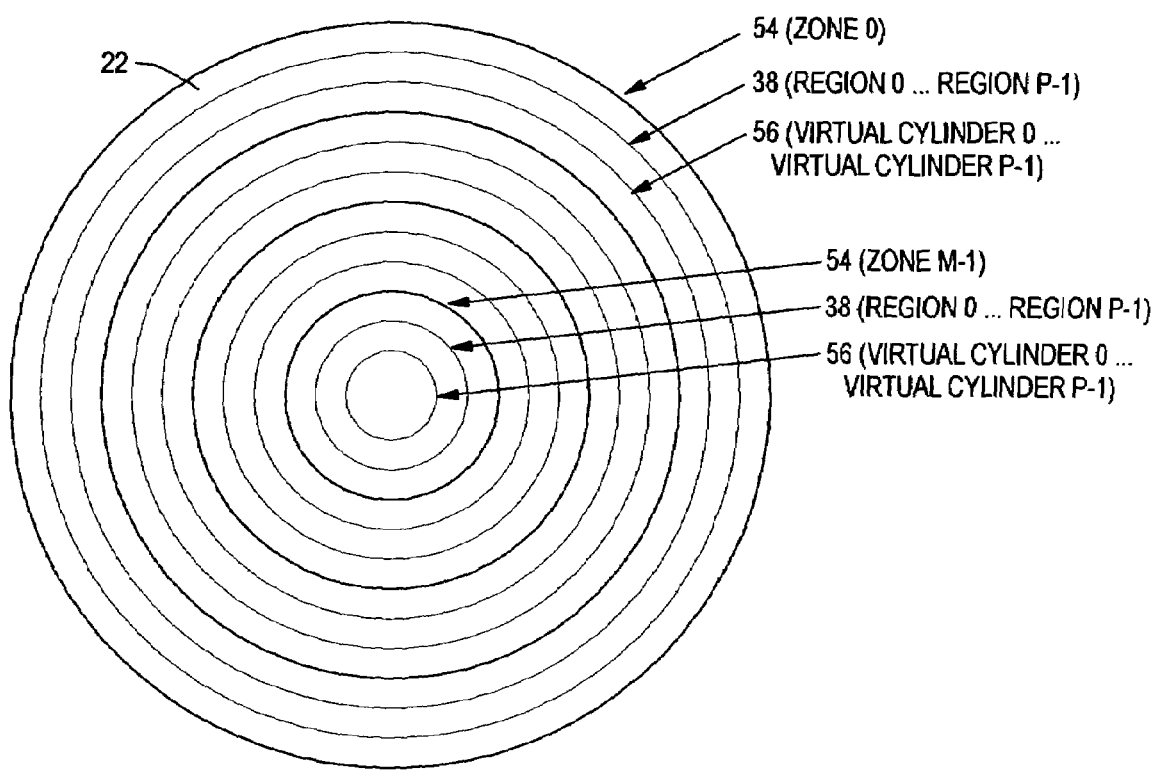
FIG. 8 shows zones on a disk surface that each include virtual cylinders.

FIG. 8 shows zones 54 on disk surface 22 that each include virtual cylinders 56. Each disk surface 22 is divided into concentric circular zones 54 that each include multiple regions 38 and multiple virtual cylinders 56. The boundaries of the zones 54 are shown as dark circles, and the boundaries of the regions 38 and the virtual cylinders 56 within the zones 54 are shown as light circles. The zones 54 each have an inner and an outer boundary at different locations on the disk surface 22, and thus are radially offset from one another. Furthermore, the disk surfaces 22 each contain the same number of the zones 54, and radially similarly situated zones 54 on different disk surfaces 22 have boundaries at essentially the same radial locations. Also, in each zone 54, the regions 38 and the virtual cylinders 56 are co-extensive since the virtual cylinders 56 each consist of radially similarly situated regions 38 on different disk surfaces 22.

The zones 54 are depicted as zones 0 to M−1, and within each zone 54, the regions 38 are depicted as regions 0 to P−1 and the virtual cylinders 56 are depicted as virtual cylinders 0 to P−1. Thus, the disk surface 22 includes M zones 54, and each zone 54 includes P regions 38 and P virtual cylinders 56. For example, zone 0 (the outermost zone) includes regions 0 to P−1 and virtual cylinders 0 to P−1, and zone M−1 (the innermost zone) includes regions 0 to P−1 and virtual cylinders 0 to P−1.

Within each virtual cylinder 56, the data track density can change from disk surface 22 to disk surface 22, the servo track density can change from disk surface 22 to disk surface 22, and the ratio of the data track density to the servo track density can change from disk surface 22 to disk surface 22. Likewise, within each virtual cylinder 56, the data track density can change and the servo track density can be the same from disk surface 22 to disk surface 22, and the data track density can be the same and the servo track density can change from disk surface 22 to disk surface 22. Likewise, within each virtual cylinder 56, the data track density can change between some disk surfaces 22 and be the same between other disk surfaces 22, and the servo track density can change between some disk surfaces 22 and be the same between other disk surfaces 22. Likewise, within each virtual cylinder 56, the data track density of a disk surface 22 can be the same as another disk surface 22 and different than another disk surface 22, and the servo track density of a disk surface 22 can be the same as another disk surface 22 and different than another disk surface 22.

Within each virtual cylinder 56, the linear bit density can also vary as described above for the track density. Furthermore, the virtual cylinders 56 need not have track densities that are related to one another. That is, since the heads 24 are measured for record/playback performance in each region 38 on each disk surface 22, the virtual cylinders 56 can have storage formats that are independent from one another. However, the virtual cylinders 56 can have similar or identical storage formats. For example, the servo tracks 34 can be written at a fixed servo track pitch across the disk surfaces 22, and then a head 24 may exhibit strong measured performance across the corresponding disk surface 22 whereas another head 24 may exhibit weak measured performance across the corresponding disk surface 22.

Figure 9:
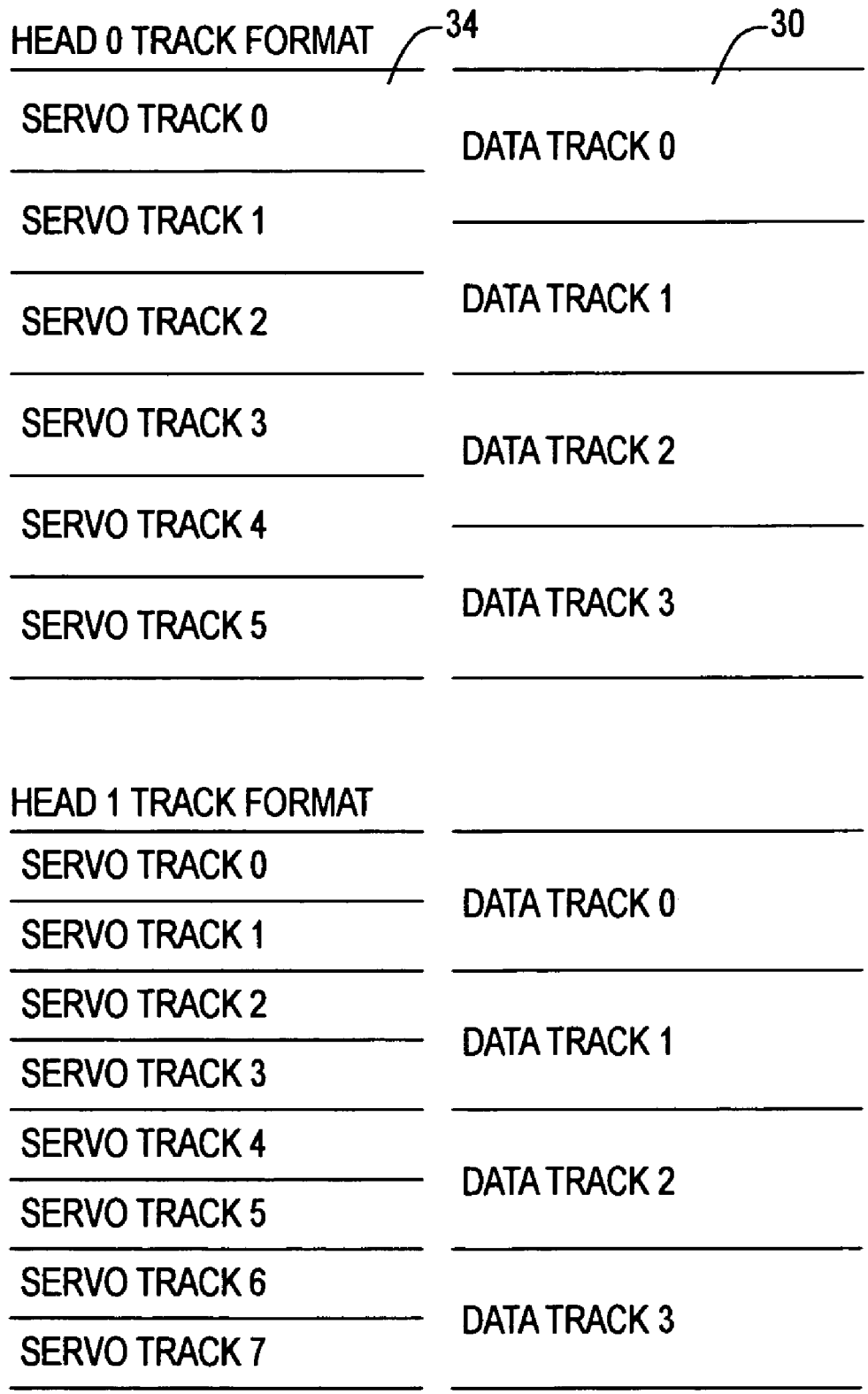
FIG. 9 shows a storage format with variable data track density and variable servo track density on different disk surfaces and the corresponding heads.

FIG. 9 shows a storage format with variable data track density and variable servo track density on different disk surfaces 22 and the corresponding heads 24. Furthermore, the ratio of the data tracks 30 to the servo tracks 34 varies between different disk surfaces 22 and different heads 24. In this example, the data track density for head 0 is less than the data track density for head 1, the servo track density for head 0 is less than the servo track density for head 1, and the ratio of the data track density to the servo track density for head 0 (3:2) is less than the ratio of the data track density to the servo track density for head 1 (2:1).

Figure 10:
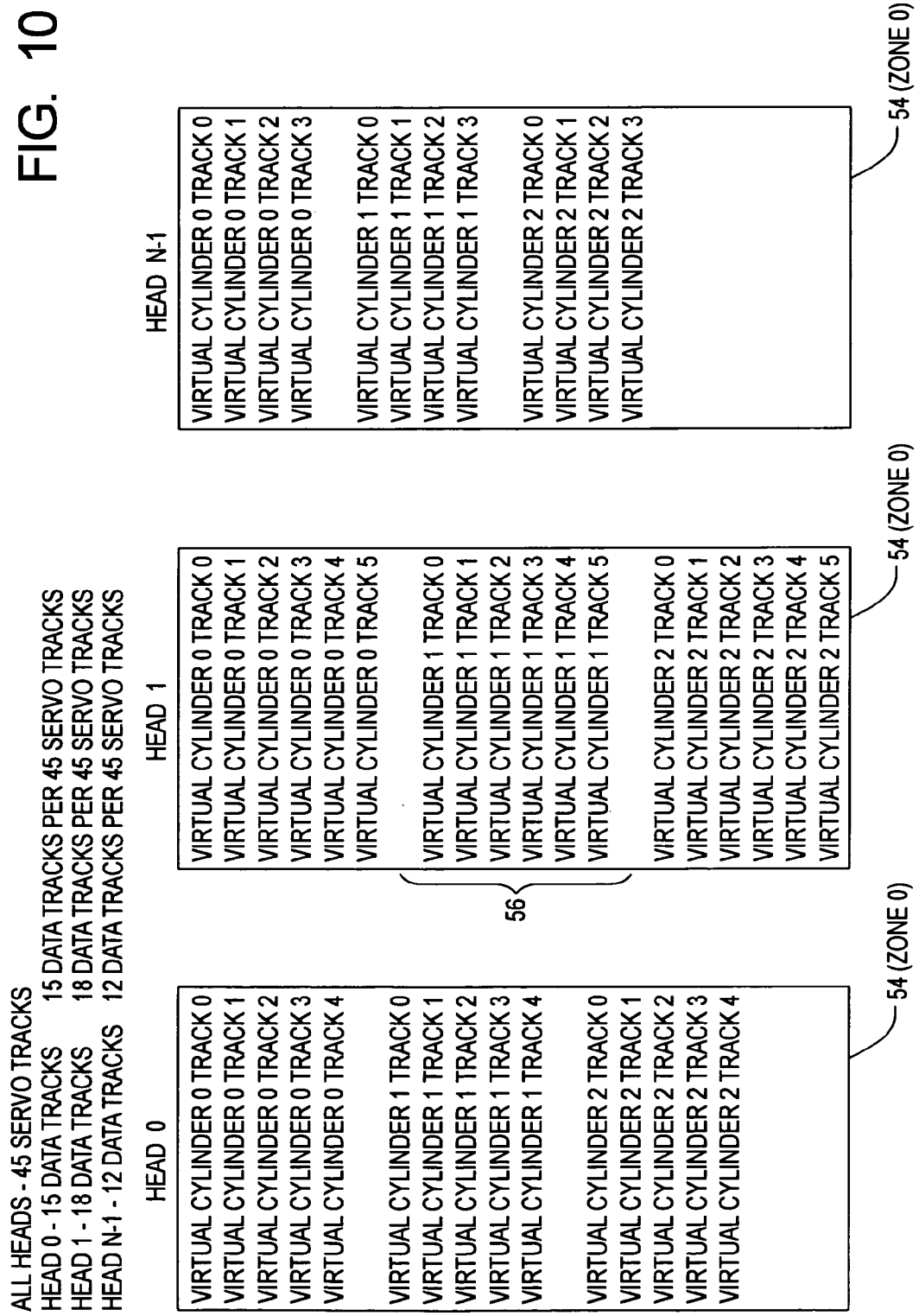
FIG. 10 shows a storage format with variable data track density and fixed servo track density within virtual cylinders and the corresponding heads.

FIG. 10 shows a storage format with variable data track density and fixed servo track density within virtual cylinders 56 and the corresponding heads 24. The data track density varies for the disk surfaces 22 within the virtual cylinders 56, however the servo track density is the same for the disk surfaces 22 within the virtual cylinders 56. In this example, the disk drive 10 includes N heads depicted as heads 0, 1 . . . N–1 and zone 0 that includes 3 virtual cylinders 56 depicted as virtual cylinders 0, 1 and 2, the virtual cylinders 56 each include 6 data tracks 30 depicted as data tracks 0, 1, 2, 3, 4 and 5, and the data tracks 30 and the servo tracks 34 are formatted in zone 0 as follows:

| | | |
|---|---|---|
| Head 0: | 15 Data Tracks | 15 Data Tracks per 45 Servo Tracks |
| Head 1: | 18 Data Tracks | 18 Data Tracks per 45 Servo Tracks |
| . . . | . . . | |
| Head N-1: | 12 Data Tracks | 12 Data Tracks per 45 Servo Tracks |

Figure 11:
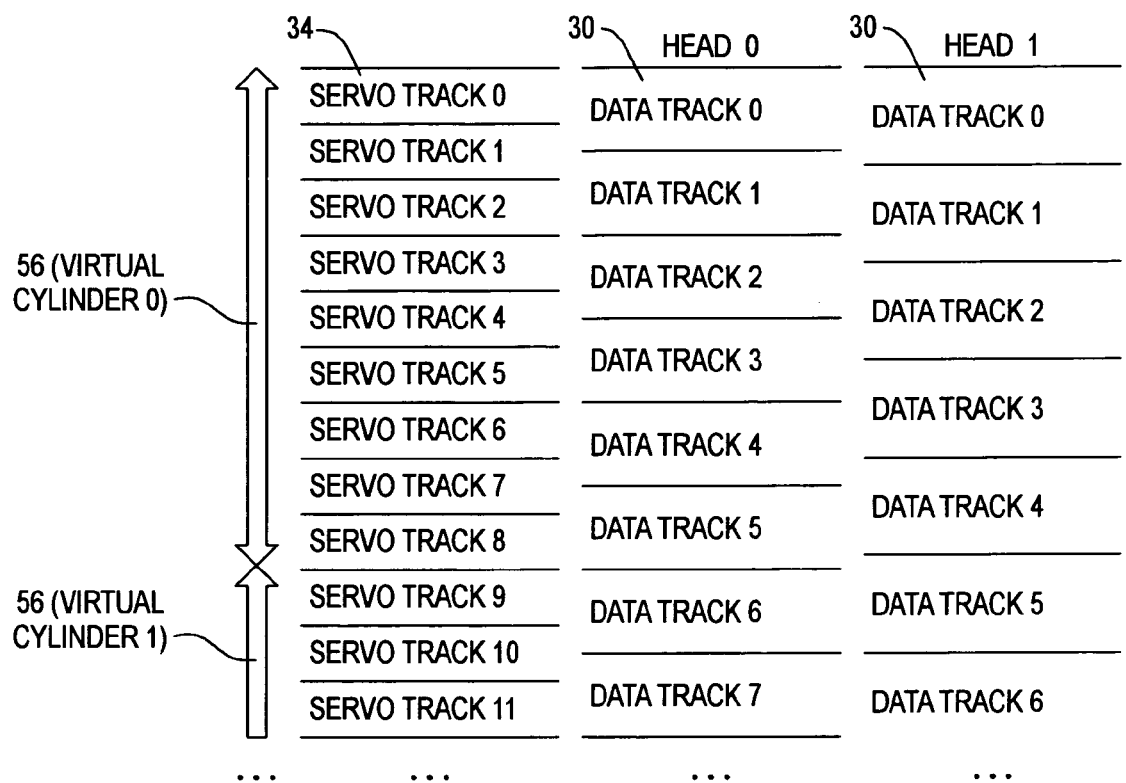
FIG. 11 shows a storage format with variable data track density and fixed servo track density within virtual cylinders and the corresponding heads.

FIG. 11 shows a storage format with variable data track density and fixed servo track density within virtual cylinders 56 and the corresponding heads 24. The data track density varies for the disk surfaces 22 within the virtual cylinders 56, however the servo track density is the same for the disk surfaces 22 within the virtual cylinders 56. Furthermore, the ratio of the data tracks 30 to the servo tracks 34 varies within the virtual cylinders 56 between different disk surfaces 22 and different heads 24. In this example, the data track density for head 0 is greater than the data track density for head 1, the servo track density for heads 0 and 1 is the same, and the ratio of the data track density to the servo track density for head 0 (3:2) is greater than the ratio of the data track density to the servo track density for head 1 (7:4). Furthermore, the data tracks 30 are not vertically aligned within the virtual cylinders 56.

Figure 12:
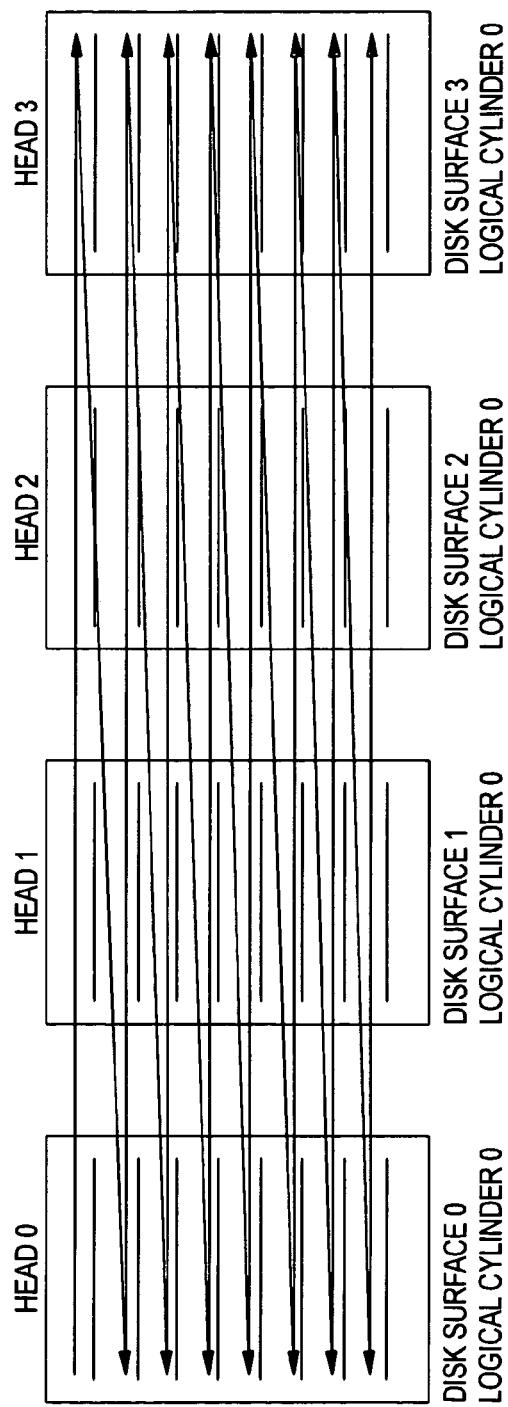
FIG. 12 shows access of data tracks on different disk surfaces in a conventional logical cylinder.

FIG. 12 shows access of data tracks on different disk surfaces in a conventional logical cylinder. Each disk surface is divided into concentric circular zones that each include data tracks and servo tracks. On a disk surface, the zones each have an inner and an outer boundary at different locations and thus are radially offset from one another. Furthermore, the disk surfaces each contain the same number of zones, and radially similarly situated zones on different disk surfaces have boundaries at essentially the same radial locations and form logical cylinders. Thus, the logical cylinders each consist of radially similarly situated zones on different disk surfaces. Within each logical cylinder, the data track density is the same and the data tracks on different disk surfaces are radially aligned with one another, although different logical cylinders may have different data track densities.

Data is sequentially accessed (read from or written to) in a logical cylinder by positioning the heads over a set of vertically aligned data tracks, then a head accessing a data track on a disk surface, then the next head accessing a data track on the next disk surface, and so on until the heads have accessed the vertically aligned data tracks on the disk surfaces, then positioning the heads over the next set of vertically aligned data tracks that are adjacent to the previous set and sequentially accessing the next set of vertically aligned data tracks head by head, and so on. In other words, the heads are positioned over vertically aligned data tracks during a seek operation and then head switches are performed between adjacent heads (without a seek operation) so that the heads sequentially access the vertically aligned data tracks on the disk surfaces, then the heads are positioned over adjacent vertically aligned data tracks during a seek operation, and so on.

In this example, the disk drive includes heads 0, 1, 2 and 3, corresponding disk surfaces 0, 1, 2 and 3 and logical cylinder 0 that includes vertically aligned data tracks on the disk surfaces. The heads are positioned over a first set of vertically aligned data tracks (the first row of data tracks) during a seek operation, then head 0 accesses the data track on disk surface 0, then head 1 accesses the data track on disk surface 1, then head 2 accesses the data track on disk surface 2, and then head 3 accesses the data track on disk surface 3. The heads are then positioned over a second set of vertically aligned data tracks (the second row of data tracks) during a seek operation, then head 0 accesses the data track on disk surface 0, then head 1 accesses the data track on disk surface 1, then head 2 accesses the data track on disk surface 2, and then head 3 accesses the data track on disk surface 3. The seek operation followed by sequential access of each disk surface using head switches are repeated until the access operation is complete.

Figure 13:
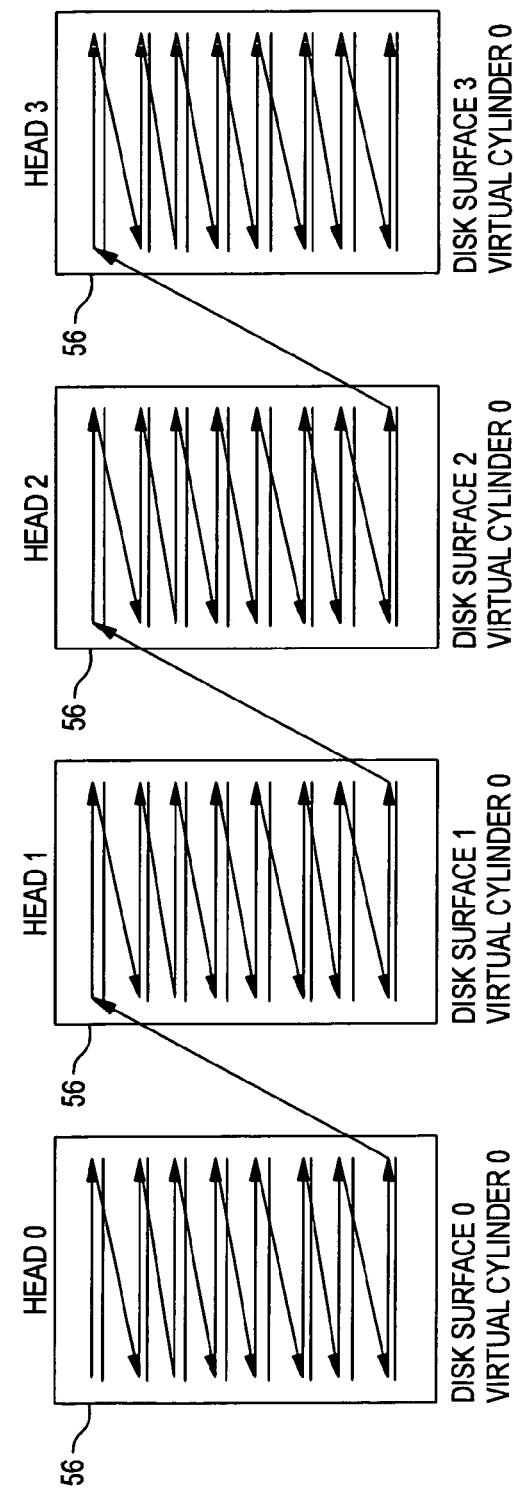
FIG. 13 shows access of data tracks on different disk surfaces in a virtual cylinder.
Figure 14:
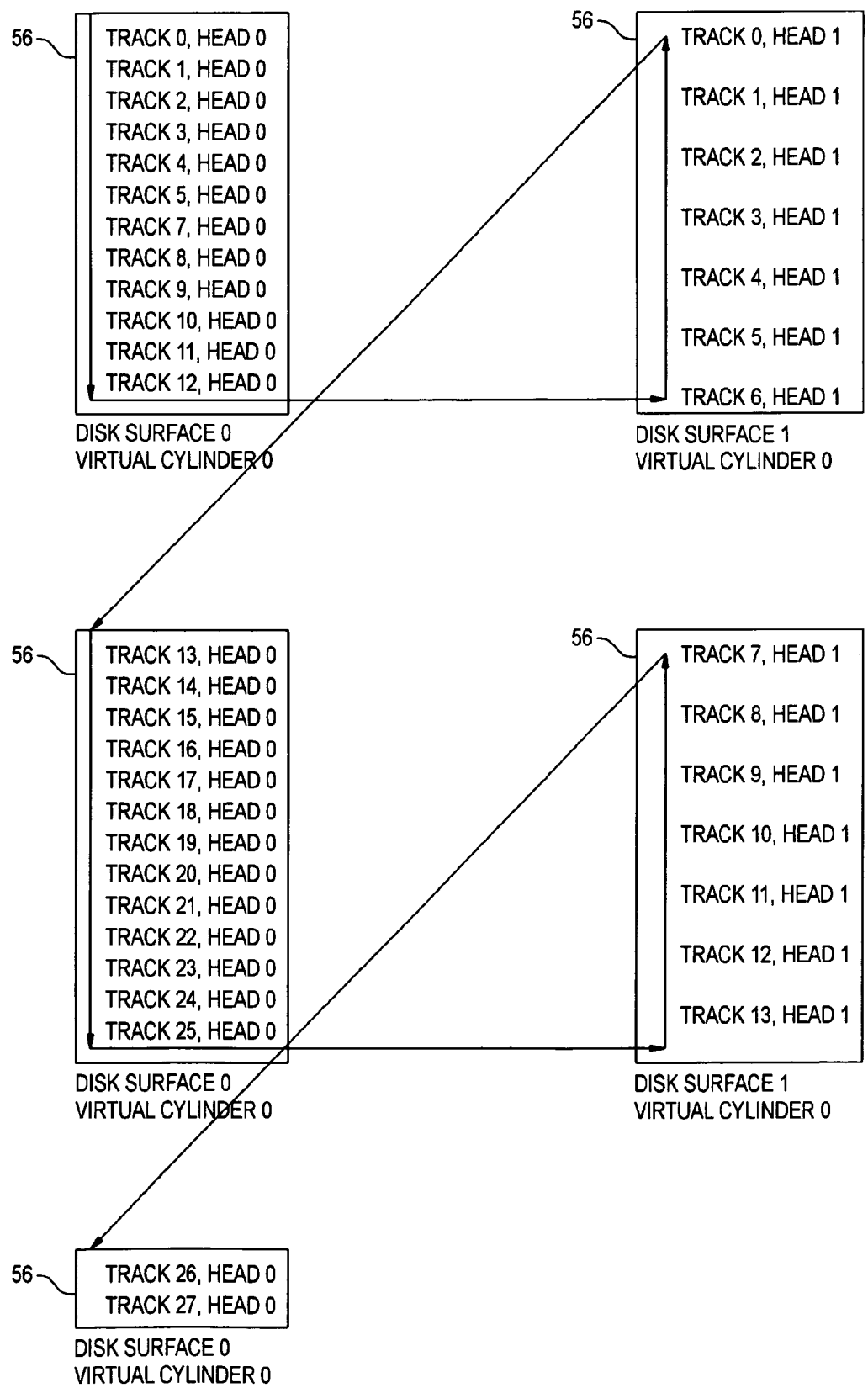
FIG. 14 shows access of data tracks on different disk surfaces in a virtual cylinder.

FIGS. 13–15 show access of data tracks 30 on different disk surfaces 22 in a virtual cylinder 56. In the virtual cylinder 56, the data track density on different disk surfaces 22 may be different, and therefore the data tracks 30 on different disk surfaces 22 may not be vertically aligned. As a result, the access operation for a conventional logical cylinder is undesirable because a head switch may also require a seek operation, thereby degrading the performance of the disk drive 10.

FIG. 13 shows data sequentially accessed in (read from or written to) the virtual cylinder 56 by positioning a head 24 over a data track 30 on a disk surface 22, then the head 24 accessing the data track 30, then positioning the head 24 over an adjacent data track 30 on the disk surface 22, then the head 24 accessing the data track 30, and so on until the head 24 sequentially accesses the data tracks 30 on the disk surface 22 in the virtual cylinder 56 (the data tracks 30 in the region 38), then positioning the next head 24 over a data track 30 on the next disk surface 22, then the next head 24 sequentially accessing the data tracks 30 on the next disk surface 22, and so on. In other words, a head 24 sequentially accesses the data tracks 30 on the corresponding disk surface 22 in the virtual cylinder 56 by sweeping across the virtual cylinder 56 in a radial direction, then a head switch and a seek operation are performed, then the next head 24 sequentially accesses the data tracks 30 on the corresponding disk surface 22 in the virtual cylinder 56 by sweeping across the virtual cylinder 56 in the same radial direction, and so on.

In this example, the disk drive includes heads 0, 1, 2 and 3, corresponding disk surfaces 0, 1, 2 and 3 and virtual cylinder 0 that includes data tracks 30 on the disk surfaces. Head 0 is positioned over the first data track 30 (the top data track 30) on disk surface 0 during a seek operation, then head 0 accesses the first data track 30 on disk surface 0, then head 0 is positioned over the second data track 30 (adjacent to the top data track 30) on disk surface 0 during a seek operation, then head 0 accesses the second data track 30 on disk surface 0, and so on until head 0 is positioned over the last data track 30 (the bottom data track 30) on disk surface 0 within virtual cylinder 0 during a seek operation, and then head 0 accesses the last data track 30 on disk surface 0 within virtual cylinder 0. A head switch is then performed and head 1 is positioned over the first data track 30 (the top data track 30) on the disk surface 1 during a seek operation, then head 1 accesses the first data track 30 on disk surface 1, then head 1 is positioned over the second data track 30 (adjacent to the top data track 30) on disk surface 1 during a seek operation, then head 1 accesses the second data track 30 on disk surface 1, and so on until head 1 is positioned over the last data track 30 (the bottom data track 30) on disk surface 1 within virtual cylinder 0 during a seek operation, and then head 1 accesses the last data track 30 on disk surface 1 within virtual cylinder 0. A head switch is then performed to head 2, then the sequential seek and access operations are repeated for disk surface 2, then a head switch is performed to head 3, and then the sequential seek and access operations are repeated for disk surface 3 until the access operation is complete.

Furthermore, since heads 0, 1, 2 and 3 sequentially access the data tracks 30 on disk surfaces 0, 1, 2 and 3, respectively, in the same radial direction, the access operation follows a repeating sweeping pattern.

FIG. 14 shows data sequentially accessed in (read from or written to) the virtual cylinder 56 by positioning a head 24 over a data track 30 on a disk surface 22, then the head 24 accessing the data track 30, then positioning the head 24 over an adjacent data track 30 on the disk surface 22, then the head 24 accessing the data track 30, and so on until the head 24 sequentially accesses a first subset of the data tracks 30 on the disk surface 22 in the virtual cylinder 56 (a first subset of the data tracks 30 in the region 38), then switching to the next head 24, then the next head 24 sequentially accessing a first subset of the data tracks 30 on the next disk surface 22, then switching to the initial head 24 and positioning the head 24 over the next data track 30 on the initial disk surface 22, then the head 24 sequentially accessing a second subset of the data tracks 30 on the disk surface 22, then switching to the next head 24, then the next head 24 sequentially accessing a second subset of the data tracks 30 on the next disk surface 22, and so on. In other words, a head 24 sequentially accesses a first subset of the data tracks 30 on the corresponding disk surface 22 in the virtual cylinder 56 in a first radial direction, then a head switch (without a seek operation) is performed and the next head 24 sequentially accesses a first subset of the data tracks 30 on the corresponding disk surface 22 in the virtual cylinder 56 in a second radial direction opposite the first radial direction, then a head switch and a seek operation are performed and the next head 24 sequentially accesses a second subset of the data tracks 30 on the corresponding disk surface 22 in the virtual cylinder 56 in the first radial direction, then a head switch (without a seek operation) is performed and the next head 24 sequentially accesses a second subset of the data tracks 30 on the corresponding disk surface 22 in the virtual cylinder 56 in the second radial direction, and so on.

In this example, the disk drive includes heads 0 and 1, corresponding disk surfaces 0 and 1 and virtual cylinder 0 that includes data tracks 0 to 27 on disk surface 0 and data tracks 0 to 13 on disk surface 1. Head 0 is positioned over data track 0 on disk surface 0 during a seek operation, then head 0 accesses data track 0 on disk surface 0, then head 0 is positioned over data track 1 on disk surface 0 during a seek operation, then head 0 accesses data track 1 on disk surface 0, and so on until head 0 is positioned over data track 12 on disk surface 0 during a seek operation, and then head 0 accesses data track 12 on disk surface 0. A head switch (without a seek operation) is then performed and head 1 accesses data track 6 on disk surface 1, then head 1 is positioned over data track 5 on disk surface 1 during a seek operation, then head 1 accesses data track 5 on disk surface 1, and so on until head 1 is positioned over data track 0 on disk surface 1 during a seek operation, and then head 1 accesses data track 0 on disk surface 1. A head switch is then performed and head 0 is positioned over data track 13 on the disk surface 0 during a seek operation, then head 0 accesses data track 13 on disk surface 0, and the sequential seek and access operations for subsets of the data tracks on disk surfaces 0 and 1 are repeated until the access operation is complete.

Advantageously, since data track 12 on disk surface 0 is vertically aligned with data track 6 on disk surface 1, and data track 25 on disk surface 0 is vertically aligned with data track 13 on disk surface 0, the head switches from head 0 to head 1 do not involve a seek operation. Positioning head 0 over data track 12 on disk surface 0 also positions head 1 over data track 6 on disk surface 1, and positioning head 0 over data track 25 on disk surface 0 also positions head 1 over data track 13 on disk surface 1.

Furthermore, since heads 0 and 1 sequentially access radially aligned subsets of the data tracks on disk surfaces 0 and 1, respectively, in opposite radial directions, the access operation follows a zig-zag pattern.

FIG. 15 shows data sequentially accessed in (read from or written to) the virtual cylinder 56 by positioning a head 24 over a data track 30 on a disk surface 22, then the head 24 accessing the data track 30, then positioning the head 24 over an adjacent data track 30 on the disk surface 22, then the head 24 accessing the data track 30, and so on until the head 24 sequentially accesses the data tracks 30 on the disk surface 22 in the virtual cylinder 56 (the data tracks 30 in the region 38), then switching to the next head 24, then the next head 24 sequentially accessing the data tracks 30 on the next disk surface 22, then switching to another head 24, and so on. In other words, a head 24 sequentially accesses the data tracks 30 on the corresponding disk surface 22 in the virtual cylinder 56 in a first radial direction, then a head switch (without a seek operation) is performed and the next head 24 sequentially accesses the data tracks 30 on the corresponding disk surface 22 in the virtual cylinder 56 in a second radial direction opposite the first radial direction, then a head switch (without a seek operation) is performed and another head 24 sequentially accesses the data tracks 30 on the corresponding disk surface 22 in the virtual cylinder 56 in the first radial direction, and so on.

In this example, the disk drive includes heads 0, 1, 2 and 3, corresponding disk surfaces 0, 1, 2 and 3 and virtual cylinder 0 that includes data tracks 30 on the disk surfaces. Head 0 is positioned over the first data track 30 on disk surface 0 during a seek operation, then head 0 accesses the first data track 30 on disk surface 0, then head 0 is positioned over the second data track 30 on disk surface 0 during a seek operation, then head 0 accesses the second data track 30 on disk surface 0, and so on until head 0 is positioned over the last data track 30 on disk surface 0 within virtual cylinder 0 during a seek operation, and then head 0 accesses the last data track 30 on disk surface 0 within virtual cylinder 0. A head switch (without a seek operation) is then performed and head 1 accesses the last data track 30 on disk surface 1, then head 1 is positioned over the second-to-last data track 30 on disk surface 1 during a seek operation, then head 1 accesses the second-to-last data track 30 on disk surface 1, and so on until head 1 is positioned over the first data track 30 on disk surface 1 within virtual cylinder 0 during a seek operation, and then head 1 accesses the first data track 30 on disk surface 1 within virtual cylinder 0. A head switch (without a seek operation) is then performed and head 2 sequentially accesses the data tracks 30 (from the first data track 30 to the last data track 30) on disk surface 2 within virtual cylinder 0, and then a head switch (without a seek operation) is performed and head 3 sequentially accesses the data tracks 30 (from the last data track 30 to the first data track 30) on disk surface 3 within virtual cylinder 0 until the access operation is complete.

Advantageously, since the last data tracks 30 on disk surfaces 0 and 1 are vertically aligned, the first data tracks 30 on disk surfaces 1 and 2 are vertically aligned, and the last data tracks 30 on disk surfaces 2 and 3 are vertically aligned, the head switches from head 0 to head 1, head 1 to head 2, and head 2 to head 3 do not involve a seek operation. Positioning head 0 over the last data track 30 on disk surface 0 also positions head 1 over the last data track 30 on disk surface 1, positioning head 1 over the first data track 30 on disk surface 1 also positions head 2 over the first data track 30 on disk surface 2, and positioning head 2 over the last data track 30 on disk surface 2 also positions head 3 over the last data track 30 on disk surface 3. Furthermore, since heads 0 and 2 and heads 1 and 3 sequentially access radially aligned data tracks 30 on disk surfaces 0 and 2 and disk surfaces 1 and 3, respectively, in opposite radial directions, the access operation follows a zig-zag pattern.

The track density and the linear bit density can be optimized for each region 38 independently of the other regions 38. Alternatively, the track density and the linear bit density for the regions 38 can be selected to provide a predetermined or optimized storage capacity and/or performance for the disk drive 10. For example, the track density and the linear bit density can be selected from predetermined values based on the performance of the head 24 for the region 38. Likewise, the track density and the linear bit density can be selected for each region 38 based on whether the head performance for the region 38 is strong, medium or weak. In addition, the storage capacity of the disk drive 10 can be maximized for the measured squeezed and unsqueezed off-track capability of the heads 24. Likewise, the track density can be selected to maximize the squeezed and unsqueezed off-track capability of the heads 24.

The track density can be selected for the region 38 using a wide variety of record/playback performance measurements between the head 24 and the region 38. For example, the performance measurement can be a 747 measurement. The term "747" comes from the resultant data profile having a similar appearance to the elevational outline of a Boeing 747 airplane. During 747 measurement, the head 24 is moved off-track until the error rate exceeds a threshold, and the distance to failure is the off-track capability. This process is repeated with adjacent tracks at smaller spacing until the off-track capability drops to zero. The resulting off-track capability versus track pitch is then analyzed to determine the optimum track pitch, typically chosen as the track pitch with the maximum off-track capability. The 747 measurement is described by Jensen et al. in "Demonstration of 500 Megabits per Square Inch with Digital Magnetic Recording," IEEE Transactions on Magnetics, Vol. 26, No. 5, September 1990, pp. 2169 et seq. See also "Measure a Disk-Drive's Read Channel Signals," Test & Measurement World, August 1999, published by Cahners Business Information, Newton, Mass. The record/playback performance measurement can also be a simple in-drive erase width measurement.

For example, a 747 profile defines head performance by squeezed off-track capability (SOTC) and unsqueezed off-track capability (UOTC) at a fixed error rate. The 747 profile for each head is moved (by changing BPI and/or TPI) to the minimum SOTC at a pre-defined track squeeze so that the disk drive has the maximum storage capacity. The 747 profiles for the heads are then moved collectively (by changing BPI and/or TPI) to maintain the SOTC so that the disk drive has the minimum storage capacity and the heads have similar SOTC and UOTC.

The SOTC and UOTC can be determined from write width (WW), read width (RW), erase width (EW), track pitch (TP), squeeze (SQZ), on-track bit error rate (BER) and a function (f) as follows:

$$UOTC = (WW-RW)/2 + EW + f(BER) \quad (1)$$

$$SOTC = TP - SQZ - (WW+RW)/2 + f(BER) \quad (2)$$

For linear bit density optimization, UOTC is the performance metric. For a given head, WW, RW and EW are constant (C). Therefore, UOTC can be determined from BER or BPI and SOTC can be determined from BPI if TP and SQZ are constant as follows:

$$UOTC = f(BER) + C$$

$$BER = f(BPI)$$

$$UOTC = f(BPI) + C \quad (3)$$

$$SOTC = TP - SQZ + f(BER) + C$$

$$SOTC = f(BPI) + C \quad (4)$$

For track density optimization, SOTC is the performance metric. For a given linear bit density, SOTC is a function of TP and SQZ. Therefore, the TP can be determined as follows:

$$SOTC = TP - SQZ + C \quad (5)$$

$$TP = SOTC + SQZ - C \quad (6)$$

The optimization algorithm can be as follows:

| | |
|---|---|
| UOTC1: | minimum required UOTC + margin |
| SOTC1: | minimum required SOTC at SQZ1 |
| SQZ1: | SQZ test point for SOTC1 |

1. Find the minimum acceptable performance point for each head by optimizing BPI: (a) run channel optimization for new BPI (for every different data rate, there is channel optimization) and (b) optimize BPI within the allowed range of formats or data rates such that the difference (UOTC−UOTC1) is minimized while satisfying the requirement of UOTC1<=UOTC.

2. Find the minimum acceptable performance point for each head by optimizing TPI: optimize track pitch within an allowed adjacent track pitch (ATP) range such that difference (SOTC−SOTC1) is minimized while satisfying the minimum performance requirement of SOTC1<=SOTC.

3. Optimize BPIs for all heads to meet the storage capacity requirement: (a) calculate: delta storage capacity= (current storage capacity−minimum storage capacity), and (b) if delta storage capacity<>nBPI step size then increase/decrease BPI by nx % within the allowed BPI for each head if possible.

4. Optimize TPIs for all heads to meet the storage capacity requirement: (a) calculate the new storage capacity, determine the new delta storage capacity, (b) calculate the delta ATP allowed for each head, and if delta storage capacity<>nATP step size then decrease/increase track pitch by delta ATP within the allowed ATP range for each head if possible.

The present invention has been described in considerable detail with reference to certain preferred versions thereof, however other versions are possible. Therefore, the spirit and scope of the appended claims should not be limited to the description of the preferred versions contained herein.

What is claimed is:

1. In a data storage device having multiple storage media surfaces and corresponding heads, each storage media surface including multiple regions, each head for recording on and playback of information from a corresponding storage media surface, a method of defining a storage format for the storage media surfaces comprising:
   reading data from each region on each storage media surface with the corresponding head;
   measuring a record/playback performance of each head for each region on each corresponding storage media surface based on the data read from the region;
   selecting a track density for each region on each storage media surface based on the measured record/playback performance of the corresponding head for the region and
   writing servo tracks in each region and then selecting the track density for data tracks in each region.

2. The method of claim 1, including defining the boundaries of each region based on the track density selected for the region.

3. The method of claim 1, wherein the track density is a data track density.

4. The method of claim 1, wherein the regions on each storage media surface are concentric regions, having an inner and an outer boundary at different radial locations on the storage media surface.

5. The method of claim 4, wherein each storage media surface includes the same number of concentric regions and the boundaries of radially similarly situated regions on different storage media surfaces are at the same radial locations.

6. The method of claim 1, wherein the data tracks have a data track density that represents a data track pitch, and the servo tracks have a servo track density that represents a servo track pitch relative to the data track pitch.

7. The method of claim 6, wherein the data track pitch in multiple regions on a storage media surface are different.

8. The method of claim 6, wherein the servo track pitch in multiple regions on a storage media surface are different.

9. The method of claim 6, wherein the data track pitch in multiple regions on a storage media surface are different, and the servo track pitch in the multiple regions on the storage media surface are different.

10. The method of claim 6, wherein the data track pitch in multiple regions on a storage media surface are essentially the same, and the servo track pitch in the multiple regions on the storage media surface are different.

11. The method of claim 6, wherein the data track pitch in multiple regions on a storage media surface are different, and the servo track pitch in the multiple regions on the storage media surface are essentially the same.

12. The method of claim 6, wherein the ratio of the data track pitch to the servo track pitch in multiple regions on a storage media surface are different.

13. The method of claim 6, wherein the ratio of the data track pitch to the servo track pitch in multiple regions on a storage media surface are essentially the same.

14. The method of claim 1, wherein the record/playback performance of each head for each region is measured at multiple locations in the region.

15. The method of claim 1, wherein the record/playback performance of each head for each region is measured at multiple read/write frequencies.

16. The method of claim 1, wherein the record/playback performance of each head for each region is measured at multiple track densities.

17. The method of claim 1, including selecting the track density to provide a predetermined storage capacity for the data storage device.

18. The method of claim 1, including selecting the track density to provide an optimum storage capacity for the data storage device.

19. The method of claim 1, including selecting the track density to provide predetermined storage capacity and performance for the data storage device.

20. The method of claim 1, including selecting a read/write frequency for each region based on the measured record/playback performance of the corresponding head for the region.

21. The method of claim 1, including selecting the track density to satisfy a constraint for the data storage device.

22. The method of claim 1, wherein the data storage device is a disk drive and each storage media surface is a disk surface.

23. A data storage device formatted by the method of claim 1.

24. In a data storage device having multiple storage media surfaces and corresponding heads, each storage media surface including multiple regions, each head for recording on and playback of information from a corresponding storage media surface, a method of defining a storage format for the storage media surfaces comprising:
   reading data from each region on each storage media surface with the corresponding head;
   measuring a record/playback performance of each head for each region on each corresponding storage media surface based on the data read from the region;
   selecting a track density for each region on each storage media surface based on the measured record/playback performance of the corresponding head for the selecting the track density to satisfy a constraint for the data storage device;
   selecting a performance metric;
   ranking the record/playback performance of each head for each region using the performance metric; and
   if the performance of a first head is below the performance metric and the performance of a second head is above the performance metric then reducing the track density for the first head and increasing the track density for the second head to satisfy the constraint.

25. The method of claim 24, wherein the constraint is storage capacity.

26. The method of claim 24, wherein the constraint is performance.

27. The method of claim 24, wherein the constraint is performance.

28. In a data storage device having multiple storage media surfaces and corresponding heads, each storage media surface including multiple regions, the regions on each storage media surface as concentric regions having an inner and an outer boundary at different radial locations on the storage media surface, each storage media surface including the same number of regions and the boundaries of radially similarly situated regions on different storage media surfaces at essentially the same radial locations, each head for recording on and playback of information from a corresponding storage media surface, a method of defining a storage format for the storage media surfaces comprising:
   reading data from each region on each storage media surface with the corresponding head;
   measuring a record/playback performance of each head for each region of each corresponding storage media surface based on the data read from the region;

selecting a track density for each region on each storage media surface based on the measured record/playback performance of the corresponding head for the region; and writing servo tracks in each region and then selecting the track density for data tracks in each region, wherein the track density is a data track density, and wherein the data tracks have a data track density that represents a data track pitch, and the servo tracks have a servo track density that represents a servo track pitch relative to the data track pitch.

29. The method of claim 28, wherein the data track pitch in multiple radially similarly situated regions on multiple storage media surfaces are different.

30. The method of claim 28, wherein the servo track pitch in multiple radially similarly situated regions on multiple storage media surfaces are different.

31. The method of claim 28, wherein the data track pitch in multiple radially similarly situated regions on multiple storage media surfaces are different, and the servo track pitch in the multiple regions are different.

32. The method of claim 28, wherein the data track pitch in multiple radially similarly situated regions on multiple storage media surfaces are essentially the same, and the servo track pitch in the multiple regions are different.

33. The method claim 28, wherein the data track pitch in multiple radially similarly situated regions on multiple storage media surfaces are different, and the servo track pitch in the multiple regions are essentially the same.

34. The method claim 28, wherein the ratio of the data track pitch to the servo track pitch in multiple radially similarly situated regions on multiple storage media surfaces are different.

35. The method claim 28, wherein the ratio of the data track pitch to the servo track pitch in multiple radially similarly situated regions on multiple storage media surfaces are essentially the same.

36. The method of claim 28, wherein the data track pitch in a first regions on a first storage media surface is greater than the data track pitch in a first regions on a second storage media surface, the data track pitch in a second regions on the first storage media surface is less than the data track pitch in a second regions on the second storage media surface, the first regions are radially similarly situated regions and the second regions are radially similarly situated regions.

37. The method of claim 28, including accessing data tracks in a set of radially similarly situated regions by, for each of the regions, sequentially accessing each data track in the region before accessing data tracks in a subsequent region of the regions.

38. In a data storage device having multiple storage media surfaces and corresponding heads, each storage media surface including multiple regions, each head for recording on and playback of information from a corresponding storage media surface, a method of defining a storage format for the storage media surfaces comprising:

reading data from each region on each storage media surface with the corresponding head;

measuring off-track capability of each head for each region on each corresponding storage media surface based on the data read from the region; and selecting a track density for each region on each storage media surface based on the measured off-track capability of the corresponding head for the region, wherein measuring the off-track capability of each head includes measuring the squeezed off-track capability and the unsqueezed off-track capability of the head.

39. The method of claim 38, including selecting the track density such that the head has a maximum off-track capability.

40. The method of claim 38, including selecting the track density such that the head has a maximum squeezed off-track capability and a maximum unsqueezed off-track capability.

41. The method of claim 38, wherein:

$SOTC = TP - SQZ - (WW + RW)/2 + f(BER)$, $UOTC = (WW - RW)/2 + EW + f(BER)$, and SOTC is squeezed off-track capability,
UOTC is unsqueezed off-track capability,
WW is write width,
RW is read width,
EW is erase width,
TP is track pitch,
SQZ is squeeze,
BER is on-track bit error rate, and
F is a function.

42. In a data storage device having multiple storage media surfaces and corresponding heads, each storage media surface including multiple regions, the regions on each storage media surface as concentric regions having an inner and an outer boundary at different radial locations on the storage media surface, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, and the data track pitch in multiple regions on a storage media surface are different.

43. In a data storage device having multiple storage media surfaces and corresponding heads, each storage media surface including multiple regions, the regions on each storage media surface as concentric regions having an inner and an outer boundary at different radial locations on the storage media surface, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, and the servo track pitch in multiple regions on a storage media surface are different.

44. In a data storage device having multiple storage media surfaces and corresponding heads, each storage media surface including multiple regions, the regions on each storage media surface as concentric regions having an inner and an outer boundary at different radial locations on the storage media surface, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, the data track pitch in multiple regions on a storage media surface are different, and the servo track pitch in the multiple regions on the storage media surface are different.

45. In a data storage device having multiple storage media surfaces and corresponding heads, each storage media surface including multiple regions, the regions on each storage media surface as concentric regions having an inner and an outer boundary at different radial locations on the storage media surface, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, the data track pitch in multiple regions on a storage media surface are essentially the same, and the servo track pitch in the multiple regions on the storage media surface are different.

46. In a data storage device having multiple storage media surfaces and corresponding heads, each storage media surface including multiple regions, the regions on each storage media surface as concentric regions having an inner and an outer boundary at different radial locations on the storage media surface, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, the data track pitch in multiple regions on a storage media surface are different, and the servo track pitch in the multiple regions on the storage media surface are essentially the same.

47. In a data storage device having multiple storage media surfaces and corresponding heads, each storage media surface including multiple regions, the regions on each storage media surface as concentric regions having an inner and an outer boundary at different radial locations on the storage media surface, each storage media surface including the same number of regions and the boundaries of radially similarly situated regions on different storage media surfaces at essentially the same radial locations, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, and the data track pitch in multiple radially similarly situated regions on multiple storage media surfaces are different.

48. In a data storage device having multiple storage media surfaces and corresponding heads, each storage media surface including multiple regions, the regions on each storage media surface as concentric regions having an inner and an outer boundary at different radial locations on the storage media surface, each storage media surface including the same number of regions and the boundaries of radially similarly situated regions on different storage media surfaces at essentially the same radial locations, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, and the servo track pitch in multiple radially similarly situated regions on multiple storage media surfaces are different.

49. In a data storage device having multiple storage media surfaces and corresponding heads, each storage media surface including multiple regions, the regions on each storage media surface as concentric regions having an inner and an outer boundary at different radial locations on the storage media surface, each storage media surface including the same number of regions and the boundaries of radially similarly situated regions on different storage media surfaces at essentially the same radial locations, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, the data track pitch in multiple radially similarly situated regions on multiple storage media surfaces are different, and the servo track pitch in the multiple regions are different.

50. In a data storage device having multiple storage media surfaces and corresponding heads, each storage media surface including multiple regions, the regions on each storage media surface as concentric regions having an inner and an outer boundary at different radial locations on the storage media surface, each storage media surface including the same number of regions and the boundaries of radially similarly situated regions on different storage media surfaces at essentially the same radial locations, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, the data track pitch in multiple radially similarly situated regions on multiple storage media surfaces are essentially the same, and the servo track pitch in the multiple regions are different.

51. In a data storage device having multiple storage media surfaces and corresponding heads, each storage media surface including multiple regions, the regions on each storage media surface as concentric regions having an inner and an outer boundary at different radial locations on the storage media surface, each storage media surface including the same number of regions and the boundaries of radially similarly situated regions on different storage media surfaces at essentially the same radial locations, each head for recording on and playback of information from a corresponding storage media surface, a method of defining a storage format for the storage media surfaces, comprising:

writing servo tracks in each region on each storage media surface; then moving each storage media surface with respect to the corresponding head and reading data from each region on each storage media surface with the corresponding head;

measuring a record/playback performance of each head for each region on each corresponding storage media surface; and selecting a track density for data tracks for each region on each storage media surface based on the measured record/playback performance of the corresponding head for the region, wherein the data tracks have a data track density that represents a data track pitch, the servo tracks have a servo track density that represents a servo track pitch relative to the data track pitch, the data track pitch in multiple radially similarly situated regions on multiple storage media surfaces are different, and the servo track pitch in the multiple regions are essentially the same.

52. In a data storage device having multiple storage media surfaces and corresponding heads, each storage media surface including multiple regions, the regions on each storage media surface as concentric regions having an inner and an outer boundary at different radial locations on the storage media surface, each storage media surface including the same number of regions and the boundaries of radially similarly situated regions on different storage media surfaces at essentially the same radial locations, each head for recording on and playback of information from a corresponding storage media surface, a method of defining a storage format for and accessing data from the storage media surfaces, comprising:

moving each storage media surface with respect to the corresponding head and reading data from each region on each storage media surface with the corresponding head;

measuring a record/playback performance of each head for each region on each corresponding storage media surface;

selecting a track density for each region on each storage media surface based on the measured record/playback performance of the corresponding head for the region; and accessing data tracks in a set of radially similarly situated regions by, for each of the regions, sequentially accessing each data track in the region before accessing data tracks in a subsequent region of the regions.

53. In a data storage device having multiple storage media surfaces and corresponding heads, each storage media surface including multiple regions, each head for recording on and playback of information from a corresponding storage media surface, a method of defining a storage format for the storage media surfaces, comprising:

moving each storage media surface with respect to the corresponding head and reading data from each region on each storage media surface with the corresponding head;

measuring unsqueezed and squeezed off-track capability of each head for each region on each corresponding storage media surface; and selecting a track density for each region on each storage media surface based on the measured squeezed and unsqueezed off-track capability of the corresponding head for the region.

54. The method of claim 53, including selecting the track density such that the head has a maximum squeezed and unsqueezed off-track capability.

55. The method of claim 53, wherein:

$SOTC=TP-SQZ-(WW+RW)/2+f(BER)$, $UOTC=(WW-RW)/2+EW+f(BER)$, and

SOTC is squeezed off-track capability,
UOTC is unsqueezed off-track capability,
WW is write width,
RW is read width,
EW is erase width,
TP is track pitch,
SQZ is squeeze,
BER is on-track bit error rate, and
f is a function.

56. In a disk drive that includes first and second disk surfaces and first and second heads, wherein the first disk surface includes first and second regions, the second disk surface includes first and second regions, the first and second regions on the first disk surface are radially offset, the first and second regions on the second disk surface are radially offset, the first regions are radially similarly situated at essentially the same radial locations, the second regions are radially similarly situated regions at essentially the same radial locations, the first head reads from and writes to the first disk surface, and the second head reads from and writes to the second disk surface, a method of defining a storage format for the disk surfaces, comprising:

writing servo tracks to the first and second disk surfaces; then writing data to the first and second regions on the first disk surface using the first head and writing data to the first and second regions on the second disk surface using the second head;

reading the data from the first and second regions on the first disk surface using the first head and reading the data from the first and second regions on the second disk surface using the second head;

measuring a performance for the firsthead for the first region on the first disk surface based on the data read from the first region on the first disk surface, measuring a performance for the first head for the second region on the first disk surface based on the data read from the second region on the first disk surface, measuring a performance for the second head for the first region on the second disk surface based on the data read from the first region on the second disk surface and measuring a performance for the second head for the second region on the second disk surface based on the data read from the second region on the second disk surface; and selecting a data track density for data tracks in the first region on the first disk surface based on the performance of the first head for the first region on the first disk surface, selecting a data track density for data tracks in the second region on the first disk surface based on the performance of the first head for the second region on the first disk surface, selecting a data track density for data tracks in the first region on the second disk surface based on the performance of the second head for the first region on the second disk surface and selecting a data track density for data tracks in the second region on the second disk surface based on the performance of the second head for the second region on the second disk surface.

57. The method of claim 56, wherein the servo tracks have the same servo track density in the first and second regions on the first and second disk surfaces.

58. The method of claim 56, wherein the data tracks in the first region on the first disk surface have a higher data track density than the data tracks in the first region on the second disk surface, and the data tracks in the second region on the first disk surface have a lower data track density than the data tracks in the second region on the second disk surface.

59. The method of claim 58, wherein the data tracks in the first region on the first disk surface and the second region on the second disk surface have the same data track density, and the data tracks in the second region on the first disk surface and the first region on the second disk surface have the same data track density.

60. The method of claim 56, wherein each performance includes off-track capability.

61. The method of claim 60, wherein each performance includes squeezed off-track capability.

62. The method of claim 60, wherein each performance includes unsqueezed off-track capability.

63. The method of claim 60, wherein each performance includes squeezed and unsqueezed off-track capability.

64. The method of claim 56, wherein measuring each performance includes comparing a measured error rate to an acceptable error rate.

65. The method of claim 64, including writing the data at a lower data track density and then reading the data and measuring the performance if the comparison is unfavorable.

66. The method of claim 64, including writing the data at the lower data track density by decrementing the data track density.

67. The method of claim 64, including selecting the lower data track density as the selected data track density if the comparison is favorable.

68. The method of claim 56, including selecting each data track density to maximize squeezed and unsqueezed off-track capability.

69. The method of claim 68, wherein:

$SOTC=TP-SQZ-(WW+RW)/2+f(BER)$, $UOTC=(WW-RW)/2+EW+f(BER)$, and

SOTC is squeezed off-track capability,
UOTC is unsqueezed off-track capability,
WW is write width,
RW is read width,
EW is erase width,
TP is track pitch,
SQZ is squeeze,
BER is on-track bit error rate, and
f is a function.

70. The method of claim 56, including selecting a linear bit density for the data tracks in the first region on the first disk surface based on the performance of the first head for the first region on the first disk surface, selecting a linear bit density for the data tracks in the second region on the first disk surface based on the performance of the first head for the second region on the first disk surface, selecting a linear bit density for the data tracks in the first region on the second disk surface based on the performance of the second head for the first region on the second disk surface and selecting a linear bit density for the data tracks in the second region on the second disk surface based on the performance of the second head for the second region on the second disk surface.

71. The method of claim 56, including calculating a storage capacity for the disk drive using each selected data track density, comparing the calculated storage capacity to a target storage capacity and qualifying the disk drive if the comparison is favorable.

72. The method of claim 71, including using the selected data track density for the first region on the first disk surface for accessing user data in the first region on the first disk surface, using the selected data track density for the second region on the first disk surface for accessing user data in the second region on the first disk surface, using the selected data track density for the first region on the second disk surface for accessing user data in the first region on the second disk surface and using the selected data track density for the second region on the second disk surface for accessing user data in the second region on the second disk surface.

73. The method of claim 71, including using the selected data track density for the first region on the first disk surface for accessing user data in the first region on the first disk surface and using a data track density other than the selected data track density for the second region on the first disk surface for accessing user data in the second region on the first disk surface, thereby reducing the storage capacity of the disk drive to a reduced storage capacity that exceeds the target storage capacity and increasing the performance of the disk drive.

74. The method of claim 71, including using the selected data track density for the first region on the first disk surface for accessing user data in the first region on the first disk surface and using a data track density other than the selected data track density for the first region on the second disk surface for accessing user data in the first region on the second disk surface, thereby reducing the storage capacity of the disk drive to a reduced storage capacity that exceeds the target storage capacity and increasing the performance of the disk drive.

75. The method of claim 71, including using the selected data track density for the first region on the first disk surface for accessing user data in the first region on the first disk surface and using a data track density other than the selected data track density for the second region on the second disk surface for accessing user data in the second region on the second disk surface, thereby reducing the storage capacity of the disk drive to a reduced storage capacity that exceeds the target storage capacity and increasing the performance of the disk drive.

76. In a disk drive that includes first and second disk surfaces and first and second heads, wherein the first disk surface includes first and second regions, the second disk surface includes first and second regions, the first and second regions on the first disk surface are radially offset, the first and second regions on the second disk surface are radially offset, the first regions are radially similarly situated at essentially the same radial locations, the second regions are radially similarly situated regions at essentially the same radial locations, the first head reads from and writes to the first disk surface, and the second head reads from and writes to the second disk surface, a method of defining a storage format for the disk surfaces, comprising:
writing servo tracks to the first and second disk surfaces; and then
for the first head in the first region on the first disk surface, the first head in the second region on the first disk surface, the second head in the first region on the second disk surface and the second head in the second region on the second disk surface:
(i) writing data at a data track density to the region using the head;
(ii) reading the data from the region using the head;
(iii) comparing an error rate of the data read from the region with an acceptable error rate;
(iv) selecting the data track density for data tracks in the region if the comparison is favorable; and
(v) decrementing the data track density and returning to step (i) if the comparison is unfavorable.

77. The method of claim 76, wherein the servo tracks have the same servo track density in the first and second regions on the first and second disk surfaces.

78. The method of claim 76, wherein the data tracks in the first region on the first disk surface have a higher data track density than the data tracks in the first region on the second disk surface, and the data tracks in the second region on the first disk surface have a lower data track density than the data tracks in the second region on the second disk surface.

79. The method of claim 78, wherein the data tracks in the first region on the first disk surface and the second region on the second disk surface have the same data track density, and the data tracks in the second region on the first disk surface and the first region on the second disk surface have the same data track density.

80. The method of claim 76, wherein step (v) includes decrementing a linear bit density for the region.

81. The method of claim 76, including calculating a storage capacity for the disk drive using each selected data track density, comparing the calculated storage capacity to a target storage capacity and qualifying the disk drive if the comparison is favorable.

82. The method of claim 81, including using the selected data track density for the first region on the first disk surface for accessing user data in the first region on the first disk surface, using the selected data track density for the second region on the first disk surface for accessing user data in the second region on the first disk surface, using the selected data track density for the first region on the second disk surface for accessing user data in the first region on the second disk surface and using the selected data track density for the second region on the second disk surface for accessing user data in the second region on the second disk surface.

83. The method of claim 81, including using the selected data track density for the first region on the first disk surface for accessing user data in the first region on the first disk surface and using a data track density other than the selected data track density for the second region on the first disk surface for accessing user data in the second region on the first disk surface, thereby reducing the storage capacity of the disk drive to a reduced storage capacity that exceeds the target storage capacity and increasing the performance of the disk drive.

84. The method of claim 81, including using the selected data track density for the first region on the first disk surface for accessing user data in the first region on the first disk surface and using a data track density other than the selected data track density for the first region on the second disk surface for accessing user data in the first region on the second disk surface, thereby reducing the storage capacity of the disk drive to a reduced storage capacity that exceeds the target storage capacity and increasing the performance of the disk drive.

85. The method of claim 81, including using the selected data track density for the first region on the first disk surface for accessing user data in the first region on the first disk surface and using a data track density other than the selected data track density for the second region on the second disk surface for accessing user data in the second region on the second disk surface, thereby reducing the storage capacity of the disk drive to a reduced storage capacity that exceeds the target storage capacity and increasing the performance of the disk drive.

* * * * *

UNITED STATES PATENT AND TRADEMARK OFFICE
CERTIFICATE OF CORRECTION

PATENT NO. : 7,283,316 B2  Page 1 of 1
APPLICATION NO. : 10/340855
DATED : October 16, 2007
INVENTOR(S) : Chiao et al.

It is certified that error appears in the above-identified patent and that said Letters Patent is hereby corrected as shown below:

Column 16, Claim 24, Line 34-35:
Please correct:
"performance of the corresponding head for the selecting the track density..."
To read -- performance of the corresponding head for the region; selecting a track density... --

Signed and Sealed this

Eleventh Day of March, 2008

JON W. DUDAS
*Director of the United States Patent and Trademark Office*